US010628989B2

(12) United States Patent
Moltaji et al.

(10) Patent No.: US 10,628,989 B2
(45) Date of Patent: Apr. 21, 2020

(54) PHOTOMETRIC IMAGE PROCESSING

(71) Applicant: ELECTRONIC ARTS INC., Redwood City, CA (US)

(72) Inventors: Amirhessam Moltaji, Vancouver (CA); Kevin Loken, Surrey (CA); Ryan Hietanen, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 9 days.

(21) Appl. No.: 16/036,422

(22) Filed: Jul. 16, 2018

(65) Prior Publication Data

US 2020/0020149 A1    Jan. 16, 2020

(51) Int. Cl.
*G09G 5/00* (2006.01)
*G06T 15/04* (2011.01)
*G06T 11/00* (2006.01)
*G06T 7/90* (2017.01)
*G06T 7/00* (2017.01)

(52) U.S. Cl.
CPC .............. *G06T 15/04* (2013.01); *G06T 7/90* (2017.01); *G06T 7/97* (2017.01); *G06T 11/001* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 6,281,904 B1* | 8/2001 | Reinhardt | ............... | G06T 15/04 345/582 |
| 8,306,283 B2* | 11/2012 | Zhang | ..................... | G06T 7/194 382/118 |
| 10,049,308 B1* | 8/2018 | Dhua | ................... | G06K 9/4628 |
| 2007/0291184 A1* | 12/2007 | Harville | ................. | G06T 3/005 348/745 |

(Continued)

OTHER PUBLICATIONS

Ma, Wan-Chun, "A Framework for Capture and Synthesis of High Resolution Facial Geometry and Performance", 118 pages, Jun. 19, 2008.

(Continued)

*Primary Examiner* — Anh-Tuan V Nguyen
(74) *Attorney, Agent, or Firm* — Lowenstein Sandler LLP

(57) ABSTRACT

An example method of photometric image processing may comprise: receiving a plurality of images of a three-dimensional object, wherein the plurality of images has been acquired by a plurality of cameras using a plurality of illumination and polarization patterns; performing color calibration of the plurality of images to produce a plurality of color-calibrated images; generating, using the plurality of color-calibrated images, a polygonal mesh simulating geometry of the three-dimensional object; producing a plurality of partial UV maps by projecting the plurality of color-calibrated images onto the polygonal mesh; generating a plurality of masks, wherein each mask of the plurality of masks is associated with a camera of the plurality of cameras, wherein the mask defines a UV space region that is covered by a field of view of the camera; blending, using the plurality (Continued)

of masks, the plurality of partial UV maps; and generating one or more texture maps representing the three-dimensional object.

**12 Claims, 30 Drawing Sheets
(25 of 30 Drawing Sheet(s) Filed in Color)**

(56) References Cited

U.S. PATENT DOCUMENTS

| | | | | |
|---|---|---|---|---|
| 2009/0161766 | A1* | 6/2009 | Bronstein | H04N 19/132 375/240.23 |
| 2009/0226049 | A1* | 9/2009 | Debevec | G06K 9/00221 382/118 |
| 2010/0315424 | A1* | 12/2010 | Cai | G06T 17/00 345/427 |
| 2013/0278626 | A1* | 10/2013 | Flagg | G06Q 30/0643 345/629 |
| 2014/0354645 | A1* | 12/2014 | Imber | G06T 15/60 345/426 |
| 2015/0178988 | A1* | 6/2015 | Montserrat Mora | G06T 13/40 345/420 |
| 2016/0284123 | A1* | 9/2016 | Hare | G06T 7/55 |
| 2016/0364847 | A1* | 12/2016 | Bouzaraa | G06T 5/007 |
| 2018/0113593 | A1* | 4/2018 | Ng | G06F 3/04815 |
| 2018/0122127 | A1* | 5/2018 | Theis | G06K 9/6219 |
| 2018/0293774 | A1* | 10/2018 | Yu | G06T 13/20 |
| 2019/0066363 | A1* | 2/2019 | Sato | G06T 17/20 |
| 2019/0166359 | A1* | 5/2019 | Lapstun | H04N 13/302 |
| 2019/0244410 | A1* | 8/2019 | Viklund | G06K 9/00228 |

OTHER PUBLICATIONS

Perez, Patrick et al., "Poisson Image Editing", 6 pages, Jul. 27-31, 2003.
Afifi, Ahmoud and Hussain, Khaled, Computational Visual Media, vol. 1, No. 4, Dec. 2015, 331-341, "MPB: A modified Poisson blending technique", 11 pages.
Park, Jaesik, et al., "Multiview Photometric Stereo using Planar Mesh Parameterization", 8 pages, Sep. 13, 2016.
Quintana, Josep, et al., Computerized Medical Imaging and Graphics, "A novel method for color correction in epiluminescence microscopy", 7 pages, Mar. 24, 2011.
U.S. Appl. No. 16/036,415, filed Jul. 16, 2018.

* cited by examiner

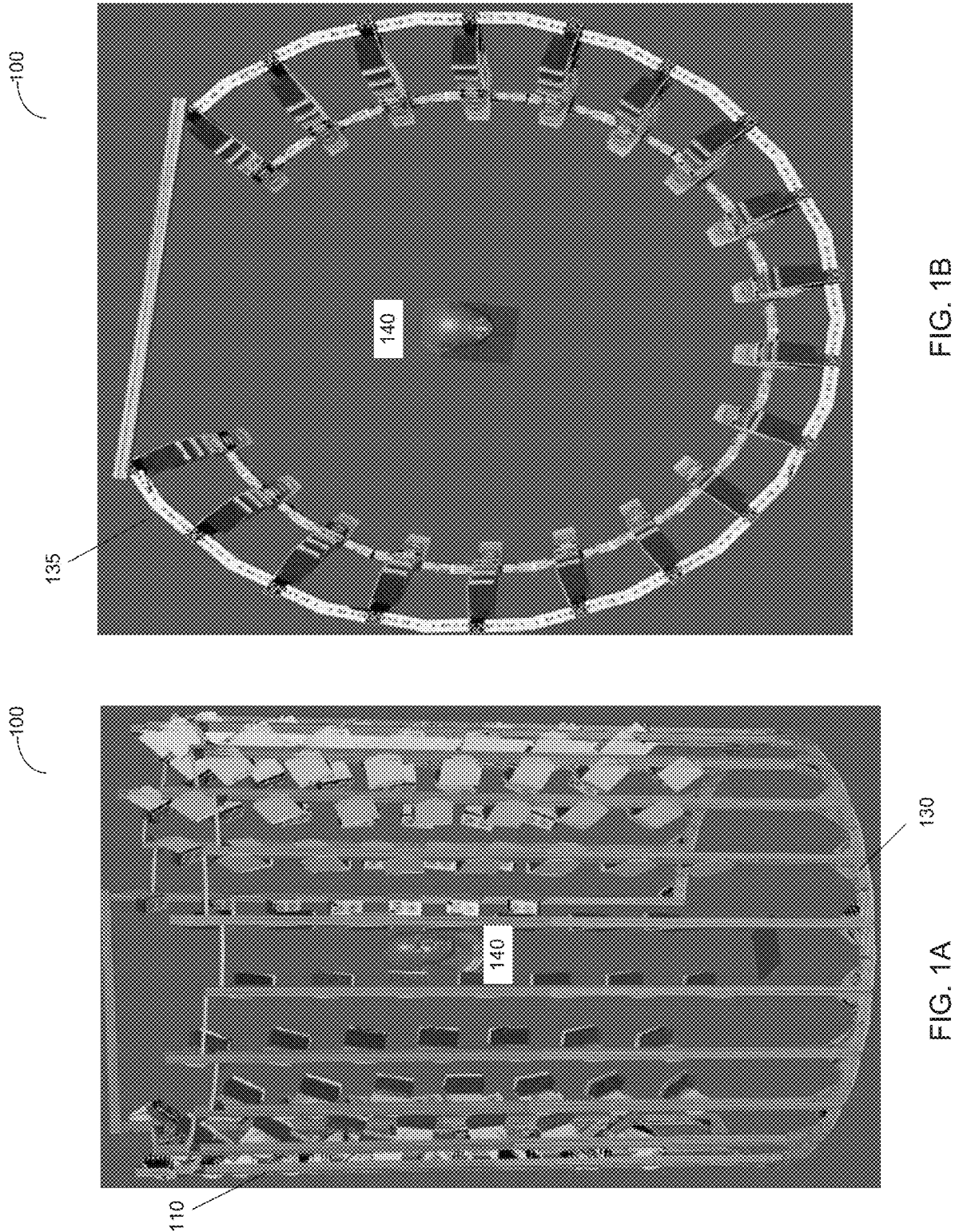

US 10,628,989 B2

PHOTOMETRIC IMAGE PROCESSING

TECHNICAL FIELD

The present disclosure is generally related to image processing, and is more specifically related to photometric image processing for producing texture maps.

BACKGROUND

In computer-generated visual content (such as interactive video games), human bodies may be represented by various computer-generated objects, including polygonal meshes and texture maps. A polygonal mesh herein shall refer to a collection of vertices, edges, and faces that define the shape and/or boundaries of a three-dimensional object. A texture map herein shall refer to a projection of an image onto a corresponding polygonal mesh.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of examples, and not by way of limitation, and may be more fully understood with references to the following detailed description when considered in connection with the figures, in which:

FIGS. 1A-1C schematically illustrate an example lighting assembly implemented in accordance with one or more aspects of the present disclosure;

FIG. 4 shows an example image acquired using $L_p$ illumination and polarization pattern implemented in accordance with one or more aspects of the present disclosure;

DETAILED DESCRIPTION

Figure 1C:
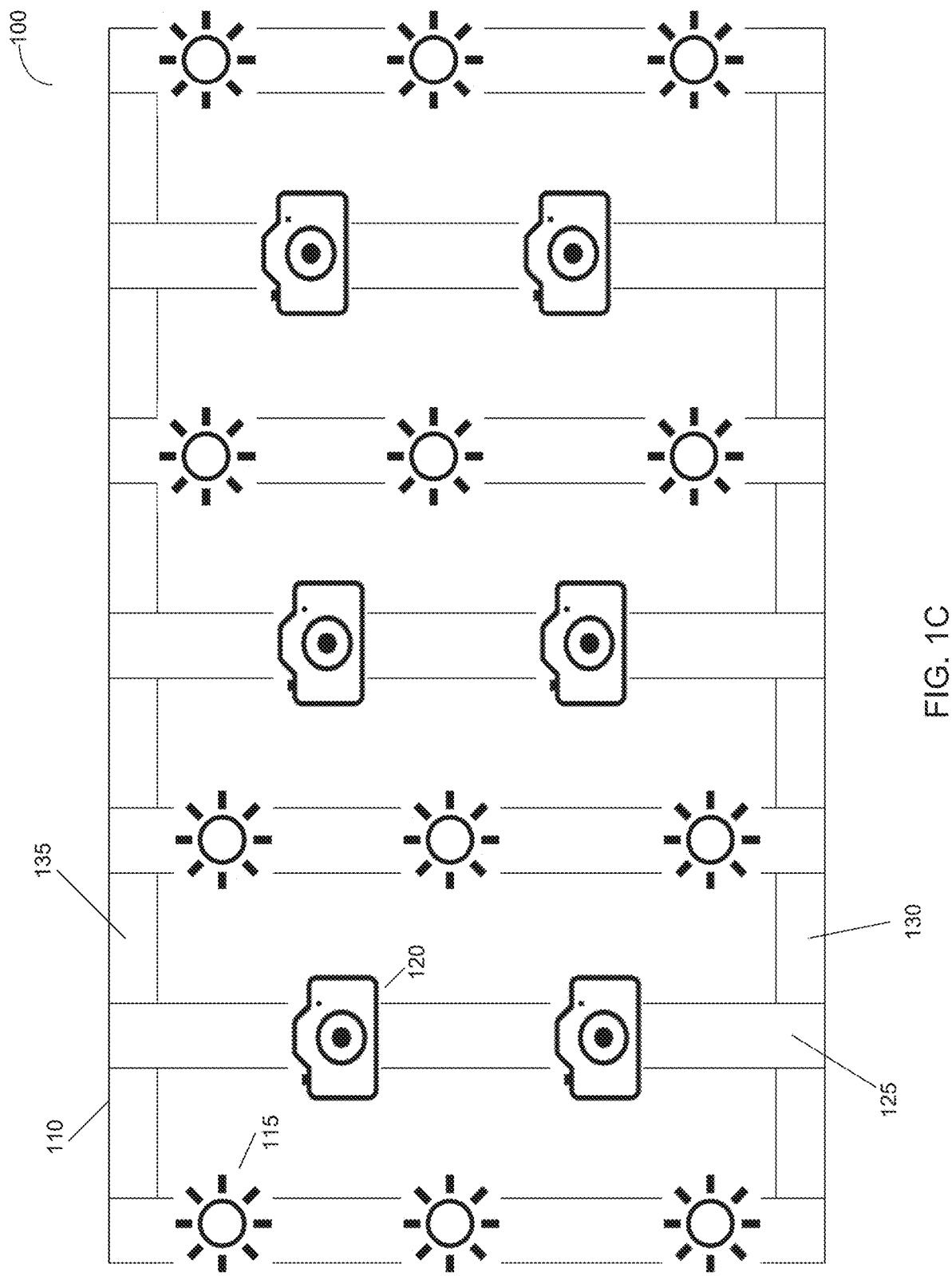

Described herein are lighting assemblies and image processing workflows for acquiring series of images of a three-dimensional object (e.g., a model's head), processing the acquired images, and generating various texture maps. Such methods and systems may be employed, for example, in interactive video game applications for generating visual objects representing game characters having visual resemblance with certain persons (e.g., models or actors).

An example lighting assembly implemented in accordance with one or more aspects of the present disclosure may include a mounting frame carrying multiple lighting fixtures and still image cameras. Each lighting fixture may include a light source, a reflector, and one or more polarization filters. The light intensity of each individual light source and/or the polarization angles of each individual polarization filter may be adjusted in order to produce various light and polarization patterns. In an illustrative example, the lighting assembly may be equipped with two sets of lights, such that the first set of lights is equipped with horizontal polarization filters and the second set of lights is equipped with vertical polarization filters, which may be controlled by a programmable controller. The programmable controller may further synchronize triggering the camera shutters with light and polarization patterns produced by the light sources, as described in more detail herein below with references to FIG. 1.

The cameras and light sources of the lighting assembly may undergo a calibration process, which ensures that the cameras are aimed to converge at the center of the cylindrical space and focus on a sphere of a pre-defined diameter or a manikin head which is placed at the center of the cylindrical space. The light sources are aimed to the center of the cylindrical space and each light is calibrated to an intensity value that would match an expected illuminance value read from a light meter placed on the surface of a sphere pointed directly at the light. These calibrated values may be used as a base input into the lighting patterns in order to ensure even lighting as multiple lights are switched on and converge on the objects surface.

Upon acquiring the images, each camera may upload the acquired images via a network connection to a server for further processing and generating the texture maps. In an illustrative example, the photometric image processing workflow starts by calibrating the acquired images using a reference color chart. The calibrated images are then undistorted based on the lens and camera sensor configurations. The undistorted images are projected onto a reconstructed polygonal mesh representing the imaged object and mapped into the UV space. UV space herein refers to a two-dimensional space produced by projecting a two-dimensional image onto a three-dimensional object, where the letters U and V denote the axes of such space.

In order to produce a single UV map, partial UV maps produced by projecting the images acquired by different cameras are blended by the mask generation and fusion blend operations. The mask generation produces, for each camera and illumination pattern, a mask that defines a region of the UV map that is best covered by the field of view of that camera. The masked images are then blended by the fusion blend operation, which creates seamless maps without losing the details and blurring the image. The blended images are utilized for generating reflectance, photometric normal, displacement maps, and albedo map, as described in more detail herein below.

The polygonal meshes and texture maps produced by the image processing workflow may be utilized by various applications, such as interactive video games. In an illustrative example, one or more files containing the polygonal meshes and textures may be distributed to one or more client gaming devices on the computer-readable media carrying executable interactive video game files. In another illustrative example, one or more files containing the polygonal meshes and textures may be downloaded and displayed by one or more client gaming devices over a network from a gaming server. Various aspects of the above referenced methods and systems are described in more detail herein below by way of examples, rather than by way of limitation.

FIGS. 1A-1C schematically illustrates an example lighting assembly implemented in accordance with one or more aspects of the present disclosure. FIG. 1A shows the side view, FIG. 1B shows the top view, and FIG. 1C shows the inside surface view. The example lighting assembly 100 may include a mounting frame 110 carrying multiple lighting fixtures 115 and camera mounts 120 for mounting still image cameras.

The mounting frame 110 may comprise a plurality of vertical bars 125 which may be attached to each other by horizontal joists 130, 135 in such a manner that the vertical bars would lie on an imaginary cylindrical surface. In an illustrative example, the cylindrical surface may cover a cylindrical segment of approximately 210 degrees. In other words, the projection of the cylindrical surface on a horizontal plane would produce an arc of approximately 210 degrees. In various implementations, this angle may vary between 180 and 270 degrees.

The height of the mounting frame may be calculated in such a manner that the head of the model 140 positioned within the lighting assembly would be near the center of the vertical axis of symmetry of the lighting assembly. In certain implementations, the model may be positioned on a chair with an adjustable height.

The vertical bars and horizontal joists may appear in various shapes and profiles, e.g., T-beams, H-beams, tubular beams, etc. The vertical bars and horizontal joists may be made of a variety of materials, including metal, wood, plastic, or any combinations of these and/or other materials.

In an illustrative example, lower ends of the vertical bars may be attached to the lower horizontal joist 130 having an arc shape; the vertical bars may be further attached to each other by a plurality of upper horizontal joists 135, such that each upper horizontal joist may have a shape of an arc and may be located in the spatial proximity of the upper end of the vertical bars.

The mounting frame may carry a plurality of lighting fixtures 115 which may be attached to the mounting frame in a grid fashion, as shown in FIG. 1C. Each lighting fixture 115 may include a light source (e.g., a light emitting diode (LED) panel, a discharge lamp, a halogen lamp, etc.), a reflector, and one or more polarization filters. A lighting fixture 115 may be attached to a vertical bar and/or a horizontal joist by an adjustable fastening mechanism which allows changing the direction of the light beam emitted by the lighting fixture. In an illustrative example, two or more lighting fixtures 115 may be oriented in such a manner that their respective light beams converge in a specified point located in a spatial proximity of the axis of symmetry of the lighting assembly. In certain implementations, the fastening mechanisms may be controlled by a programmable controller.

The light intensity of each individual light source may be adjusted, e.g., by a programmable controller which may communicate to the lighting fixtures using DMX protocol. In an illustrative example, multiple light sources which are mounted at the same height measured from the lower end of the lighting assembly may be configured to produce the same light intensity. Furthermore, light intensity of a light source located further away from the center of the vertical axis of symmetry of the lighting assembly may be higher than the light intensity of another light source located closer to the center point of the vertical axis of symmetry, so that both light sources would produce the same scene brightness.

As noted herein above, each lighting fixture 115 may further include a polarization filter. The polarization angle of the filter may be adjustable, in order to produce various polarization patterns, which are described in more detail herein below.

The mounting frame 110 may further carry a plurality of still image cameras, which may be attached to the mounting frame by camera mounts 120. The cameras may be positioned and calibrated in order to produce high-quality images of a model which is positioned approximately in the center of the vertical axis of symmetry of the lighting assembly. In an illustrative example, the cameras may be positioned in a grid fashion between the lighting fixtures 115, as schematically illustrated by FIG. 1C.

Each camera may be equipped with a wireless triggering device, such that multiple cameras may be controlled by a programmable controller. The programmable controller may synchronize triggering the camera shutters with setting light and polarization patterns produced by the light sources. Various light and polarization patterns are described in more detail herein below. In an illustrative example, the controller may poll all cameras and upon receiving an acknowledgement from all requisite cameras, adjust the polarization filters and initiate a lighting sequence to be produced by lighting fixtures. Thus, for each facial expression, a series of images with different lighting and polarization patterns may be acquired by each camera. Upon acquiring the images, each camera may upload the acquired images via a network connection to a server for further processing, e.g., as described in more detail herein below with reference to FIG. 2.

In certain implementations, the lighting assembly may be further equipped with a reference video system comprising one or more video cameras and one or more video screens configuring to display the video feeds received from the video cameras in order to provide a visual feedback to the model positioned within the lighting assembly.

Figure 2:
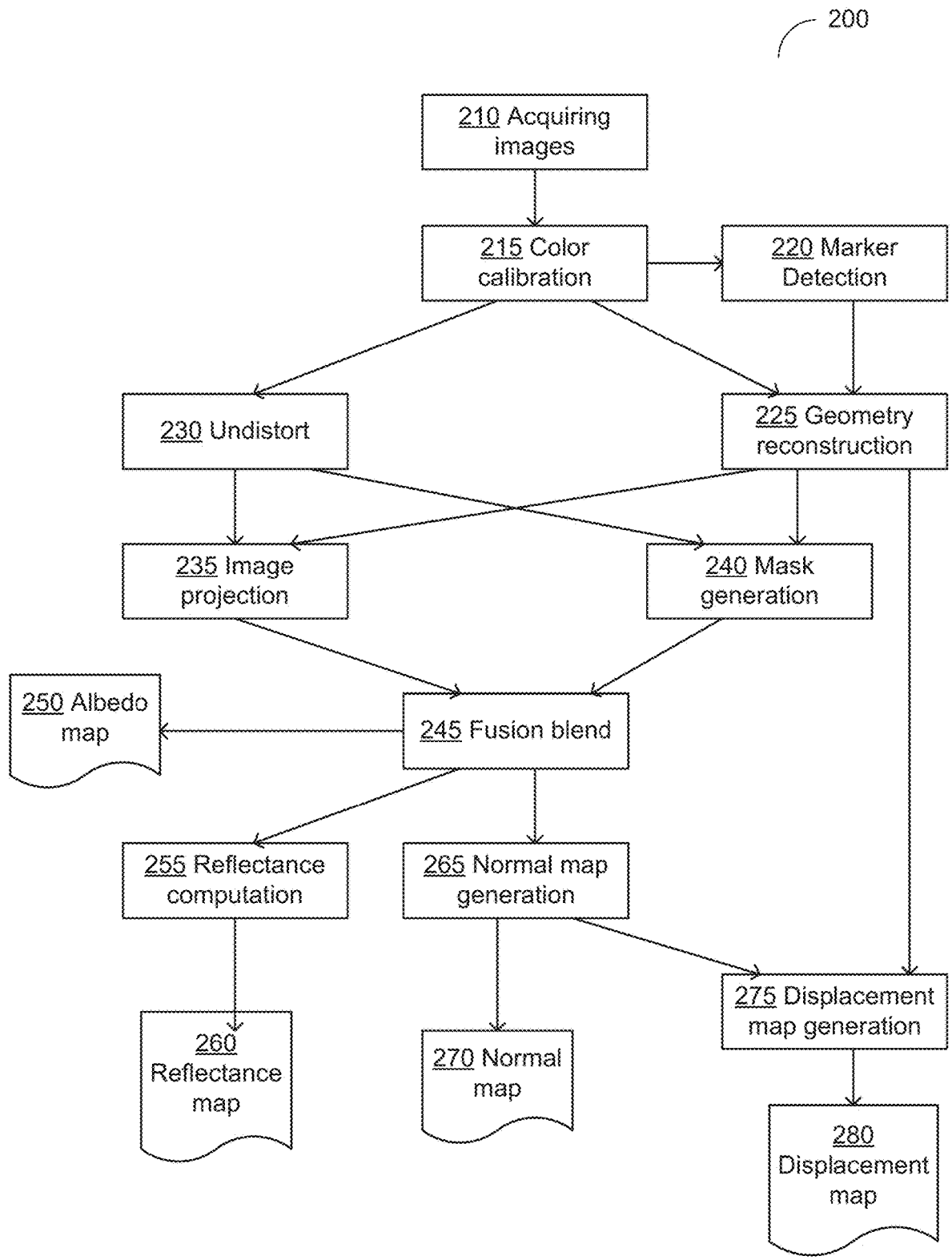
FIG. 2 depicts a flowchart of an example photometric image processing workflow, in accordance with one or more aspects of the present disclosure.

FIG. 2 depicts a flowchart of an example photometric image processing workflow 200 which may be employed for acquiring and processing images of a three-dimensional object (e.g., a model's head), in accordance with one or more aspects of the present disclosure. The example image processing workflow 200 and/or each of its individual functions, routines, subroutines, or operations may be performed by one or more processors of a computer system (e.g., the computer system 2900 of FIG. 29), and may further employ one or more cameras, lighting assemblies, light synchronization controllers, and/or other equipment. The image processing workflow 200 may be performed by one or more processing threads, each thread executing one or more individual functions, routines, subroutines, or operations of the method.

As schematically illustrated by FIG. 2, the processing workflow 200 may start, at block 210, by acquiring one or more series of images of a model. In an illustrative example, a series of images of a model may be acquired using the lighting assembly 100 of FIG. 1. For each facial expression, a series of images with different lighting and polarization patterns may be acquired by each camera.

Figure 3:
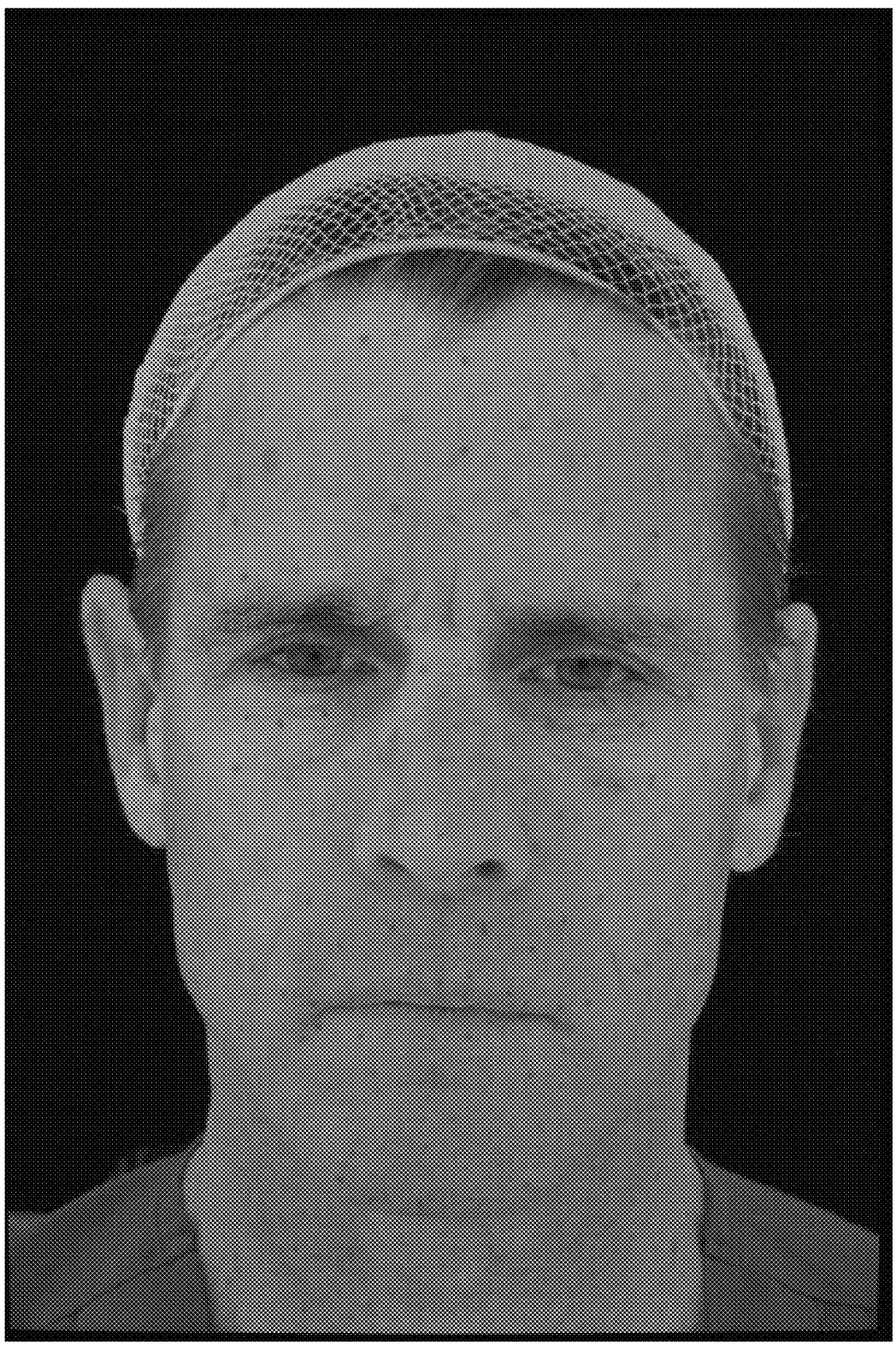

In an illustrative example, the first illumination and polarization pattern (denoted as $L_c$) may provide full-on illumination with cross-polarized filters, such that a polarization filter is installed vertically at each camera lens and another polarization filter is installed horizontally in front of each light source. Using this illumination and polarization pattern allows capturing diffuse lights only, and hence, the images produced using this pattern may be utilized for creating albedo and reflectance maps. FIG. 3 shows an example image acquired using $L_c$ illumination and polarization pattern.

Figure 4:
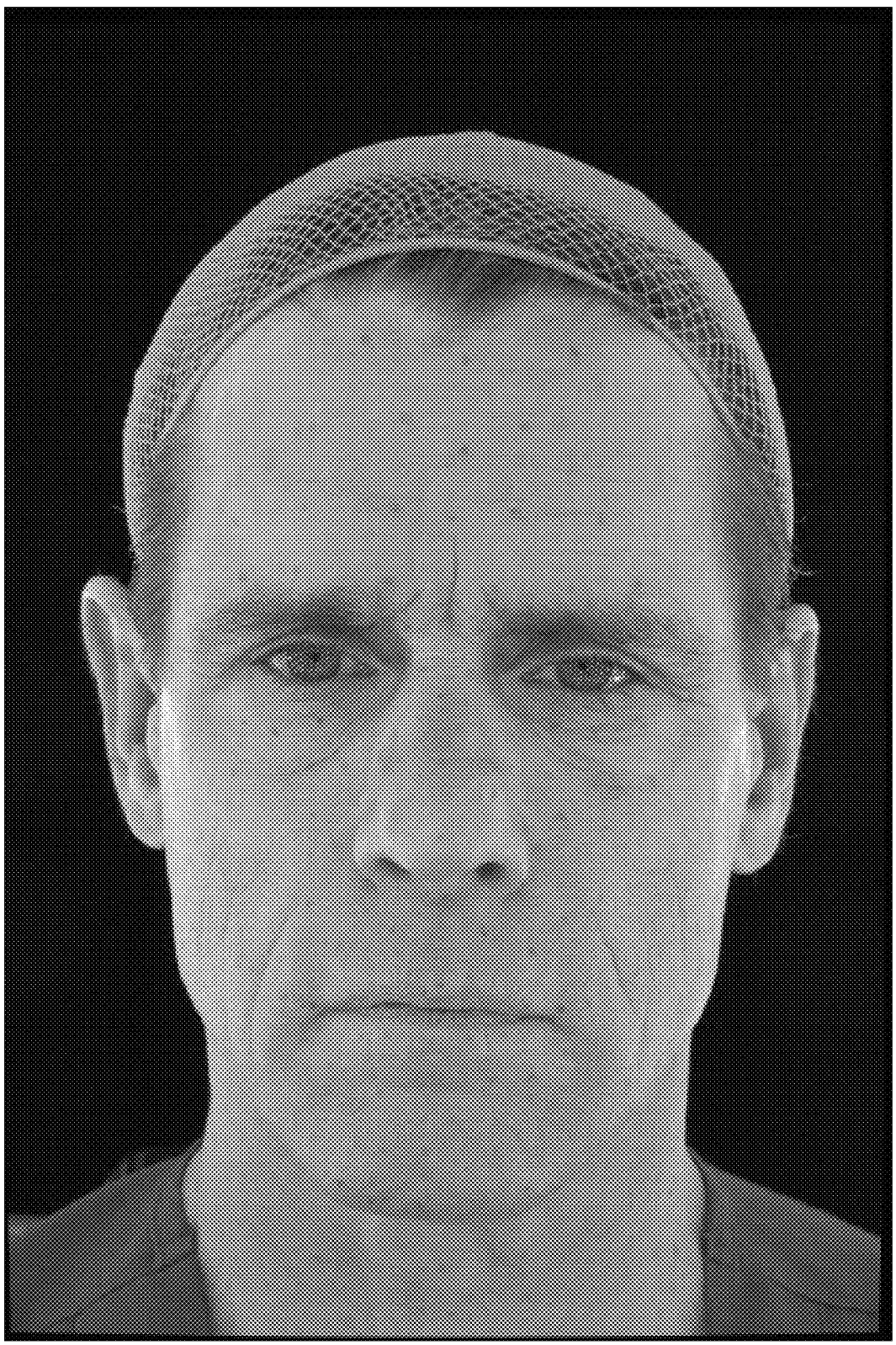
FIG. 4 shows an example image acquired using $L_c$ illumination and polarization pattern implemented in accordance with one or more aspects of the present disclosure.

The second illumination and polarization pattern (denoted as $L_p$) may provide full-on illumination with parallel-polarized filters, such that all polarization filters are vertically positioned. Using this illumination and polarization pattern allows capturing specular reflection and diffuse lights, and hence, the images produced using this pattern may be utilized for geometry reconstruction (i.e., generating a polygonal mesh representing the geometry of the imaged object) and generating the reflectance map. FIG. 4 shows an example image acquired using $L_p$ illumination and polarization pattern.

Figure 5:
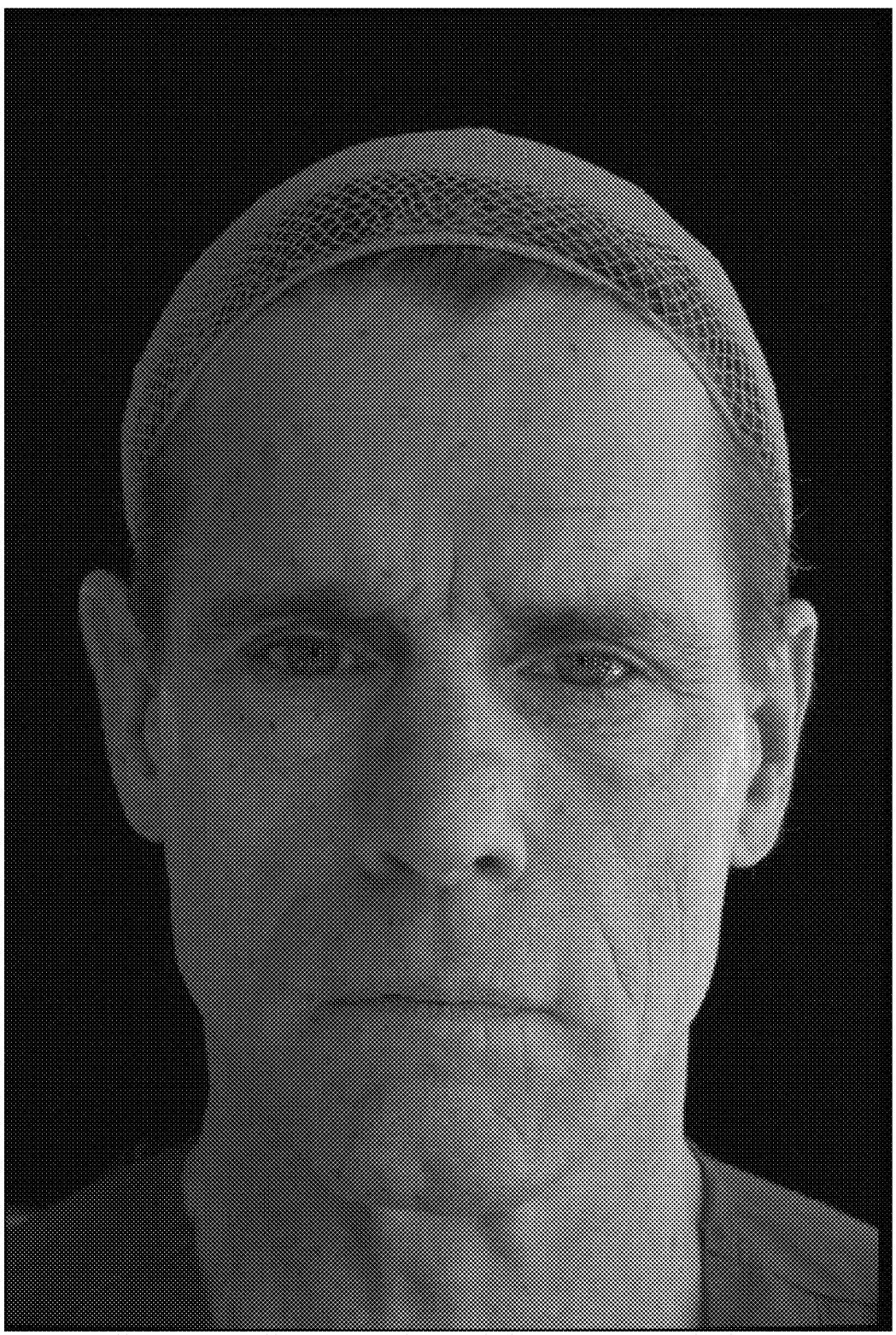
FIG. 5 shows an example image acquired using $L_x$ illumination and polarization pattern implemented in accordance with one or more aspects of the present disclosure.
Figure 6:
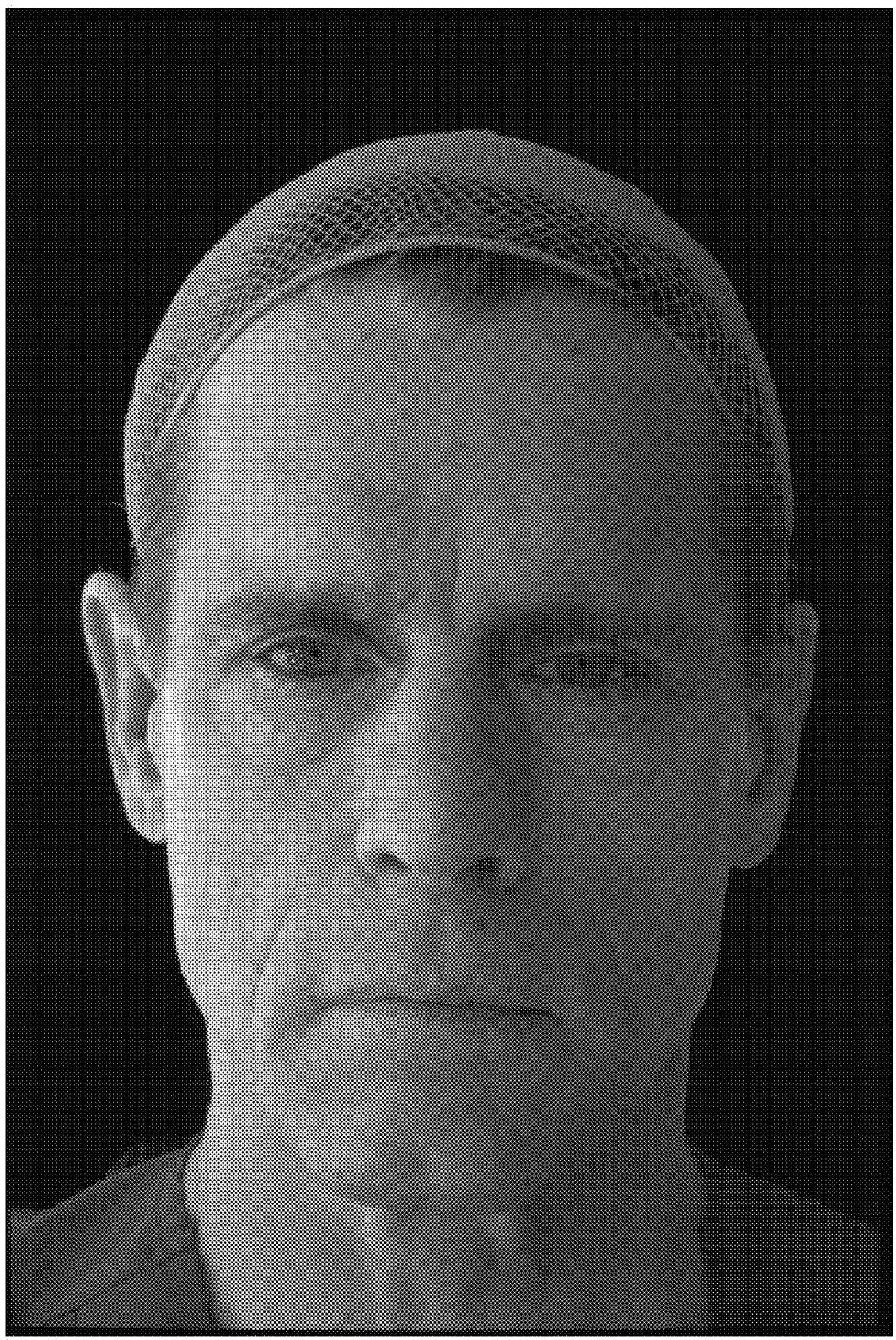
FIG. 6 shows an example image acquired using $L\hat{}_x$ illumination and polarization pattern implemented in accordance with one or more aspects of the present disclosure.
Figure 7:
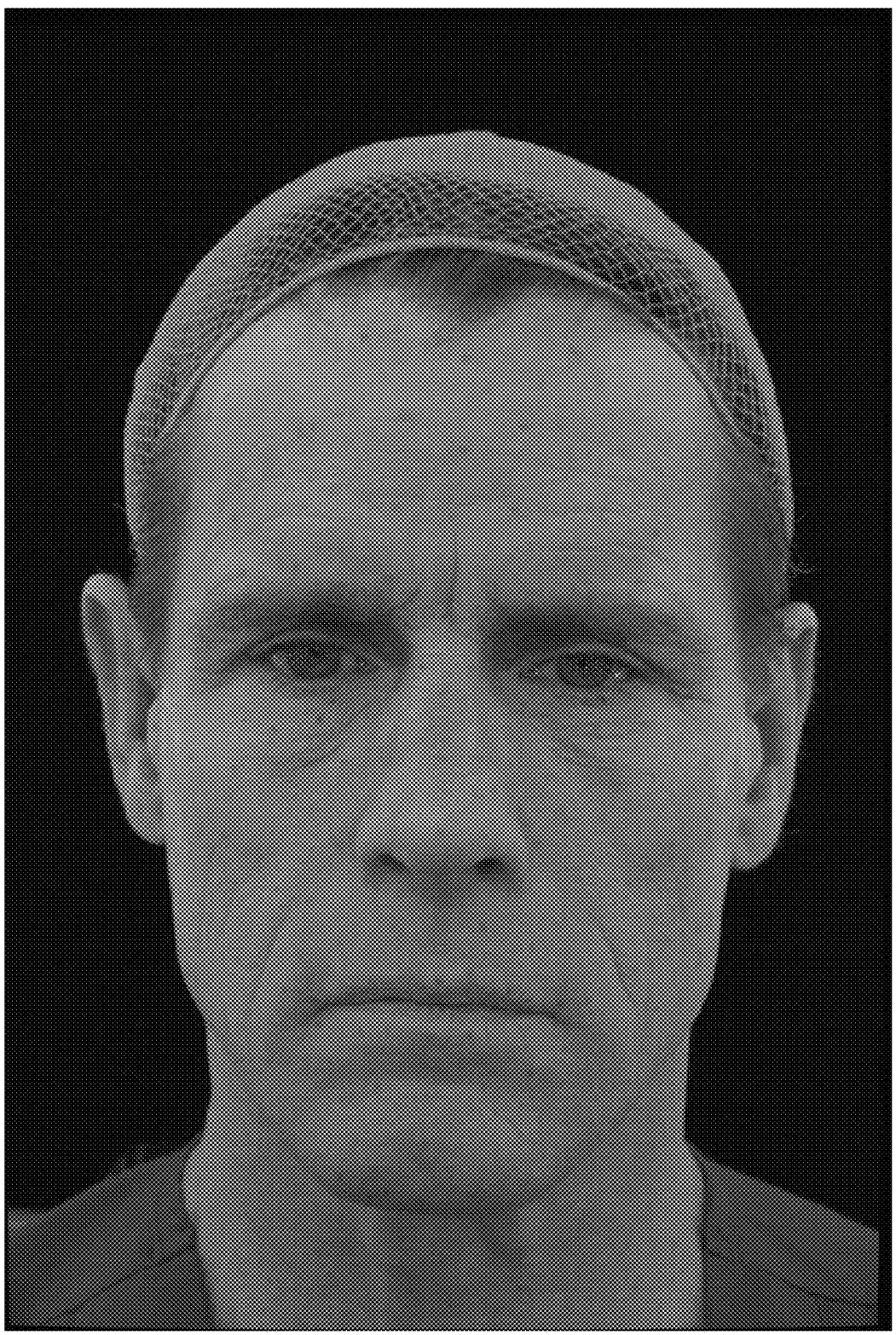
FIG. 7 shows an example image acquired using $L_y$ illumination and polarization pattern implemented in accordance with one or more aspects of the present disclosure.
Figure 8:
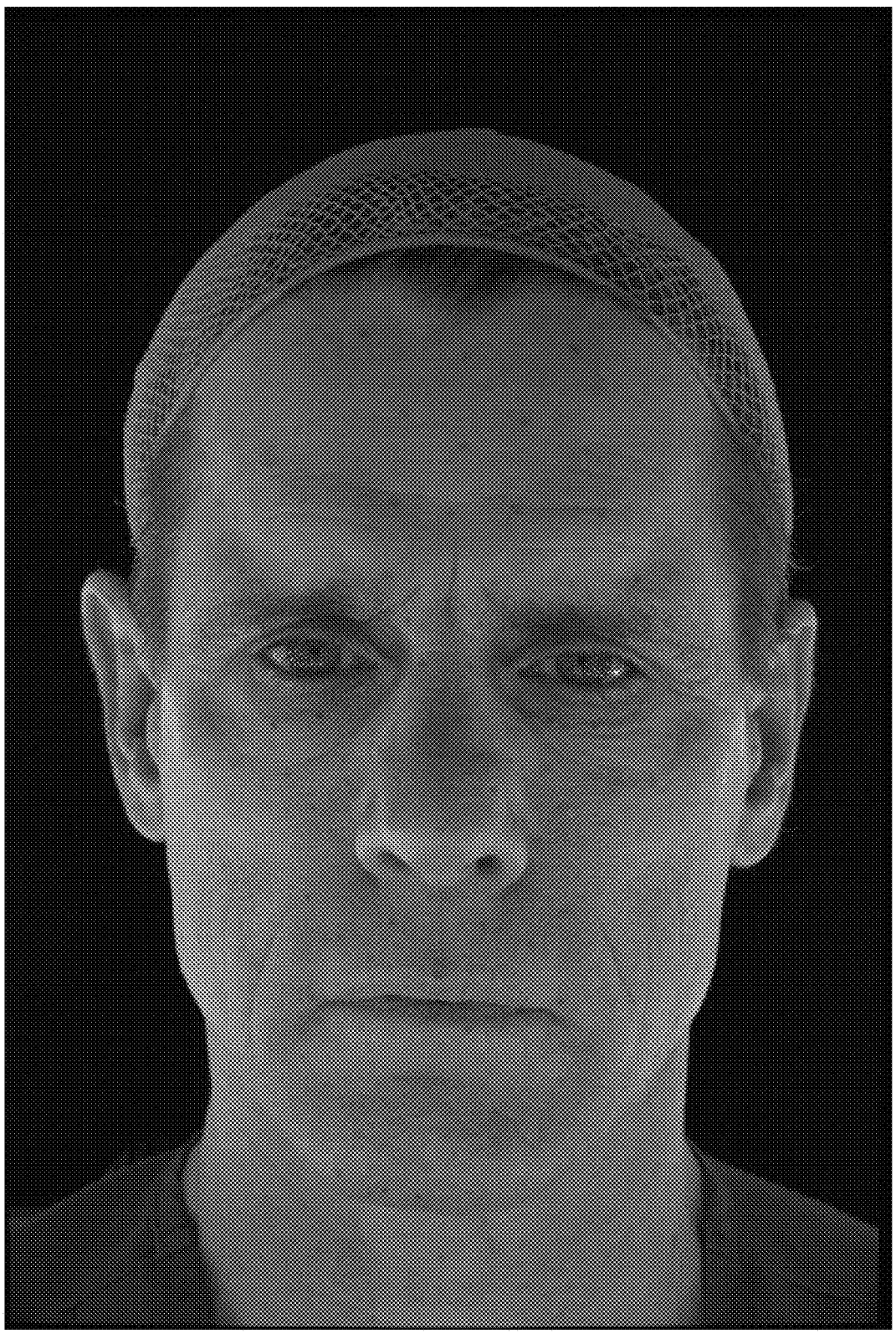
FIG. 8 shows an example image acquired using $L\hat{}_y$ illumination and polarization pattern implemented in accordance with one or more aspects of the present disclosure.
Figure 9:
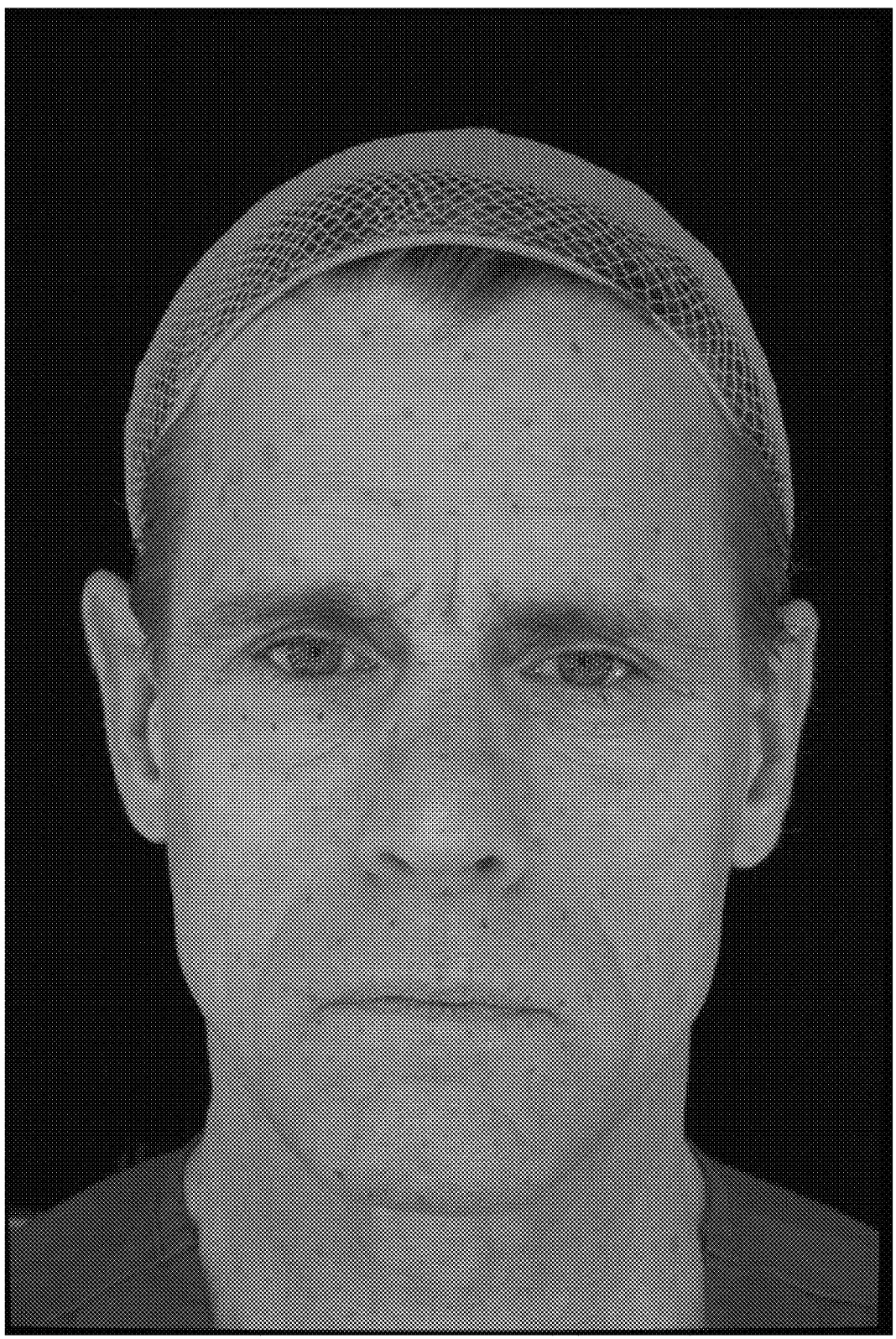
FIG. 9 shows an example image acquired using $L_z$ illumination and polarization pattern implemented in accordance with one or more aspects of the present disclosure.
Figure 10:
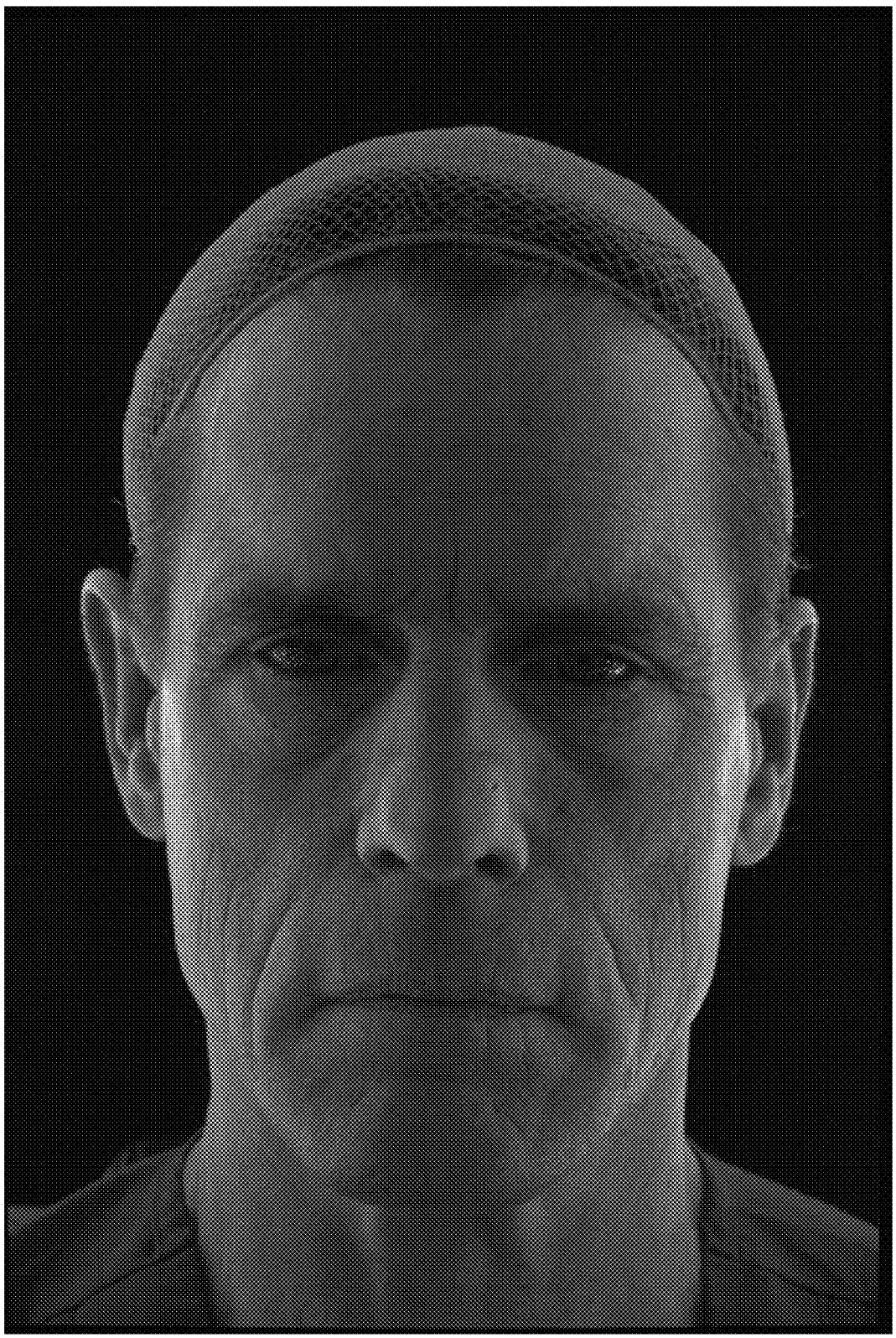
FIG. 10 shows an example image acquired using $L\hat{}_z$ illumination and polarization pattern implemented in accordance with one or more aspects of the present disclosure.
Figure 11:
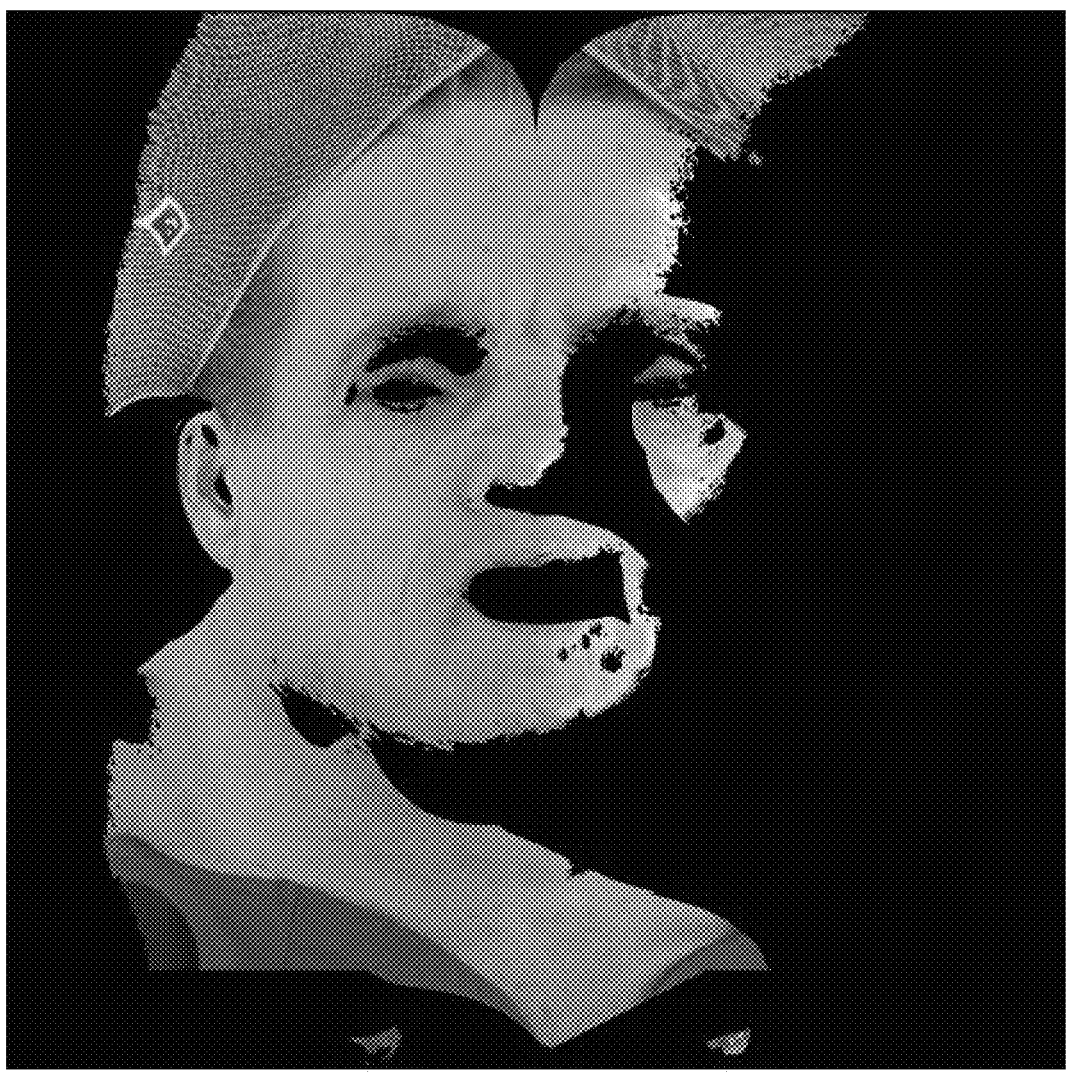
FIG. 11 shows an example projected image partially covering the UV map, in accordance with one or more aspects of the present disclosure.
Figure 12:
FIG. 12 shows an example albedo map produced by the example image processing workflow implemented in accordance with one or more aspects of the present disclosure.
Figure 13:
FIG. 13 shows an example blended images that have been acquired using $L_p$ illumination and polarization pattern implemented in accordance with one or more aspects of the present disclosure.
Figure 14:
FIG. 14 shows an example blended images that have been acquired using $L_x$ illumination and polarization pattern implemented in accordance with one or more aspects of the present disclosure.
Figure 15:
FIG. 15 shows an example blended images that have been acquired using $L\hat{}_x$ illumination and polarization pattern implemented in accordance with one or more aspects of the present disclosure.
Figure 16:
FIG. 16 shows an example blended images that have been acquired using $L_y$ illumination and polarization pattern implemented in accordance with one or more aspects of the present disclosure.
Figure 17:
FIG. 17 shows an example blended images that have been acquired using $L\hat{}_y$ illumination and polarization pattern implemented in accordance with one or more aspects of the present disclosure.
Figure 18:
FIG. 18 shows an example blended images that have been acquired using $L_z$ illumination and polarization pattern implemented in accordance with one or more aspects of the present disclosure.
Figure 19:
FIG. 19 shows an example blended images that have been acquired using $L_z$ illumination and polarization pattern implemented in accordance with one or more aspects of the present disclosure.
Figure 20:
FIG. 20 shows an example reflectance map produced by the example image processing workflow implemented in accordance with one or more aspects of the present disclosure.

Six more illumination and polarization patterns (denoted $L_x$, $L_y$, $L_z$, $L\hat{}_x$, $L\hat{}_y$, and $L\hat{}_z$) employ parallel-polarized filters and partial illumination to generate the photometric normal map. FIG. 5 shows an example image acquired using $L_x$ illumination and polarization pattern. FIG. 6 shows an example image acquired using $L\hat{}_x$ illumination and polarization pattern. FIG. 7 shows an example image acquired using $L_y$ illumination and polarization pattern. FIG. 8 shows an example image acquired using $L\hat{}_y$ illumination and polarization pattern. FIG. 9 shows an example image acquired using $L_z$ illumination and polarization pattern. FIG. 20 shows an example image acquired using $L\hat{}_z$ illumination and polarization pattern.

In various alternative implementations, other equipment and/or illumination and polarization patterns may be employed for acquiring series of images of the model.

The acquired images are calibrated using a reference color chart (block 215), as described in more detail herein below. After calibration, marker detection (block 220) may be performed on the images which have been acquired with $L_p$ illumination and polarization pattern (full-on illumination with parallel polarized filters) in order to detect positions of markers of a pre-defined color (e.g., green) in each image. The marker positions are then utilized for reconstructing the geometry of the three-dimensional object (block 225) and generating a three-dimensional polygonal mesh simulating geometry of the three-dimensional object.

The calibrated images may be un-distorted (block 230) based on the lens and camera sensor configurations. The undistorting procedure may remove the radial distortion (which may make straight lines appear as curved ones) and tangential distortion (which may make some areas of the image to appear closer than expected) due to the image taking lens not being truly parallel to the imaging plane).

Figure 21:
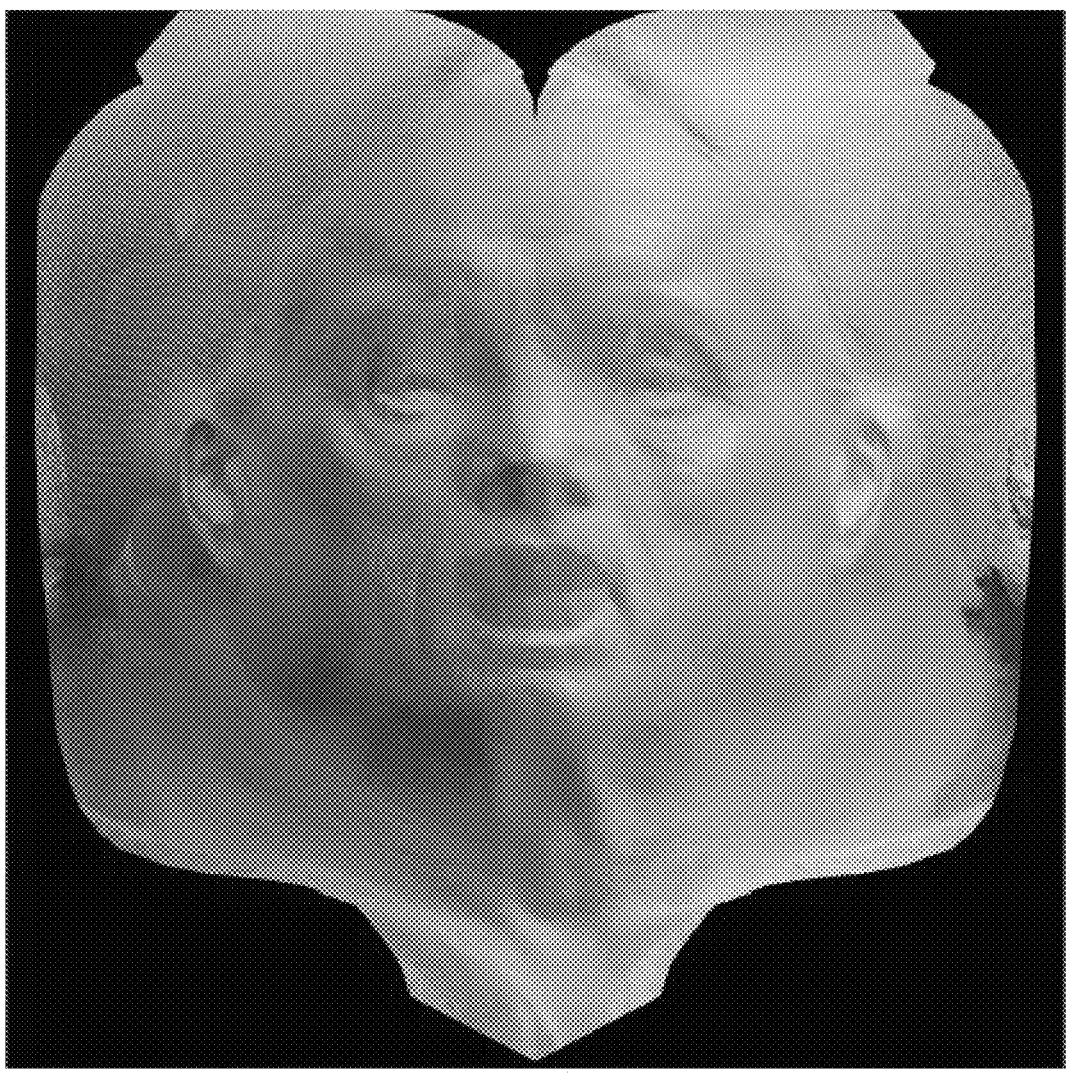
FIG. 21 shows an example photometric normal map produced by the example image processing workflow implemented in accordance with one or more aspects of the present disclosure.

The undistorted images may then be projected onto the reconstructed polygonal mesh (block 235) and mapped into its UV layout in order to produce UV maps. As schematically illustrated by FIG. 21, each projected image at least partially covers the UV map, since the field of view of the camera that has produced the image covers at least part of the three-dimensional object of interest (e.g., model's head). In order to produce a single UV map for each illumination pattern, partial UV maps produced by projecting the images acquired by different cameras may be blended by the mask generation (block 240) and fusion blend (block 245) operations. The mask generation produces, for each camera and illumination pattern, a mask that defines a region of the UV map that is best covered by the field of view of that camera, as described in more detail herein below. The masked images are then blended by the fusion blend operation, which creates seamless maps without losing the details and blurring the image.

Figure 22:
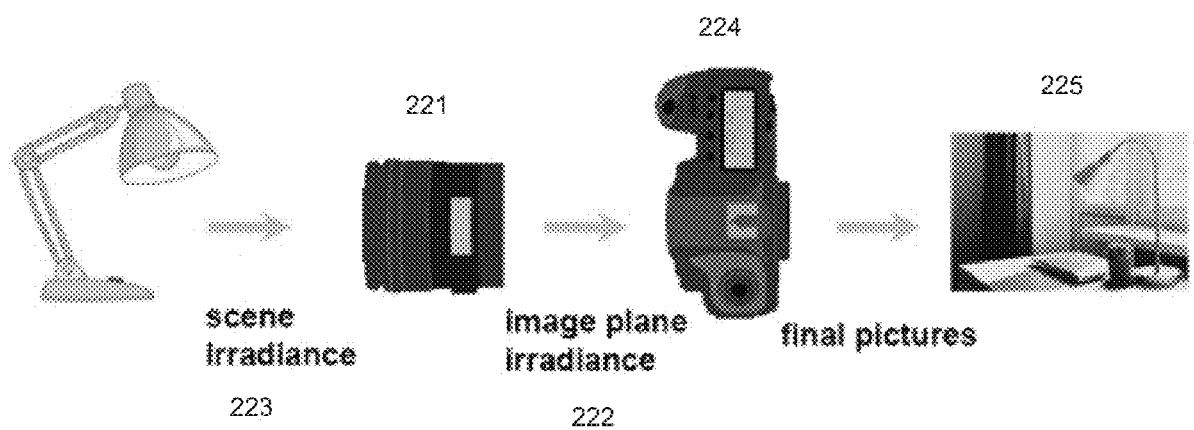
FIG. 22 schematically illustrates an example image capture sequence implemented in accordance with one or more aspects of the present disclosure.
Figure 23:
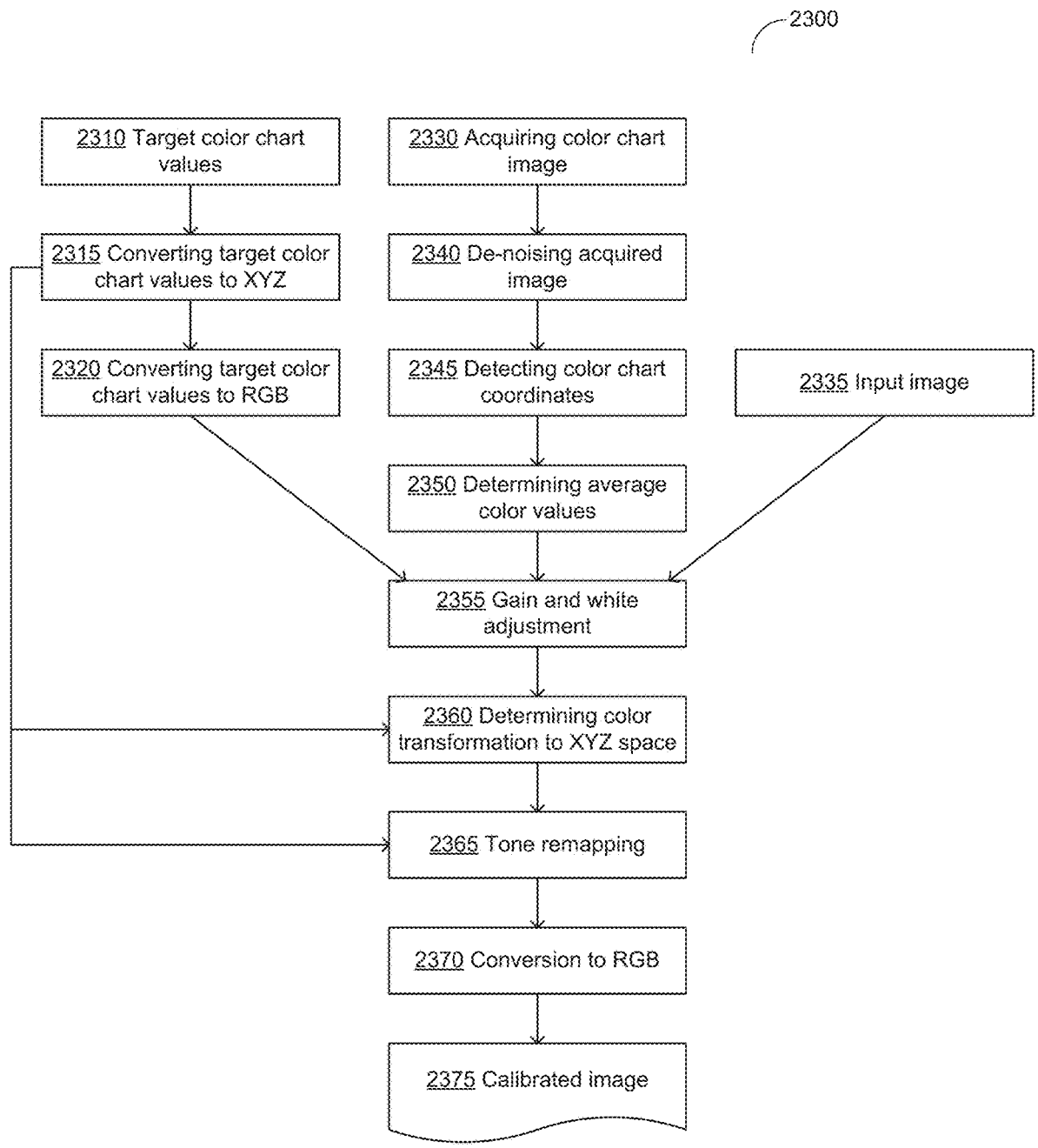
FIG. 23 depicts a flowchart of an example method for color calibration implemented in accordance with one or more aspects of the present disclosure.
Figure 24:
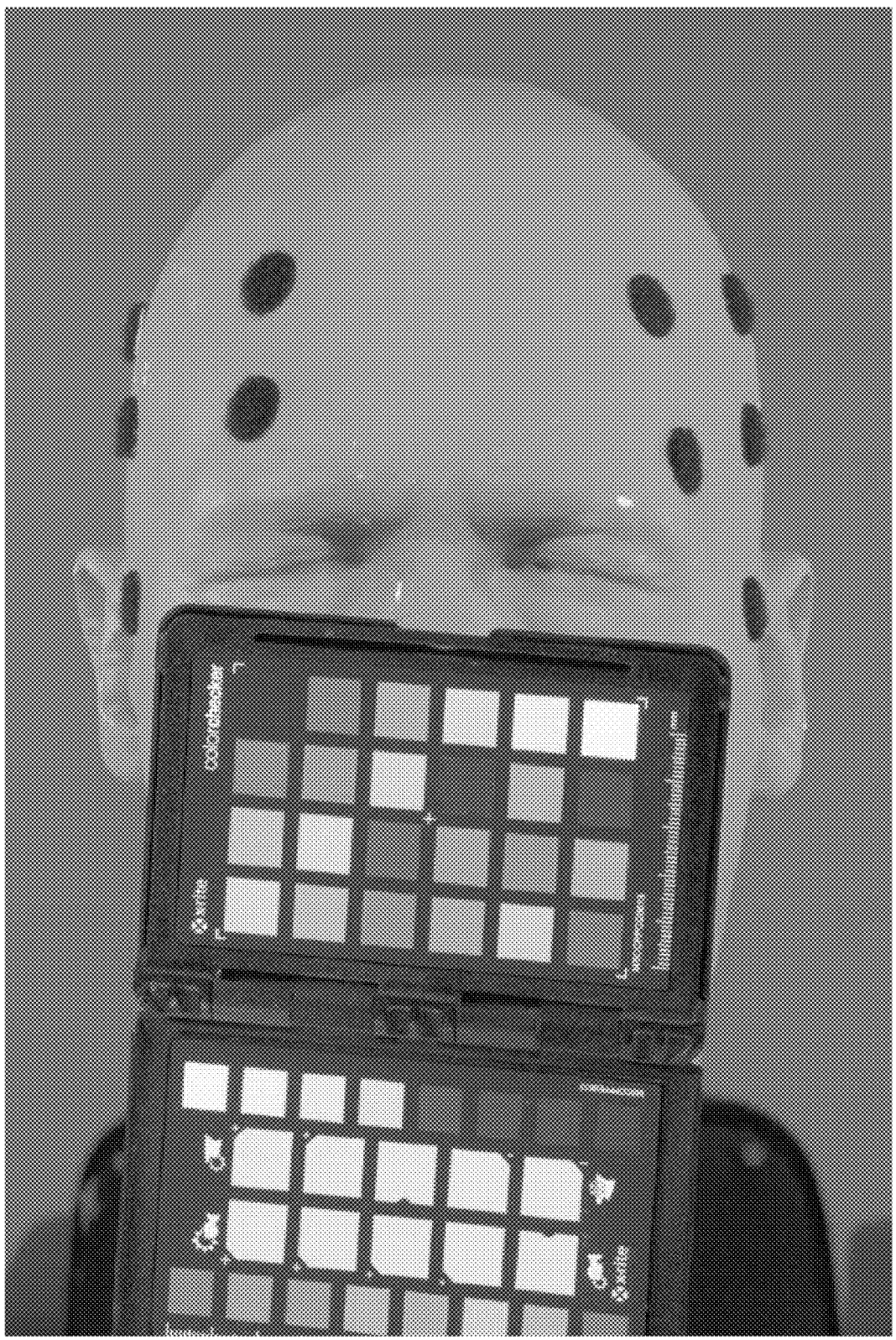
FIG. 24 depicts an example color chart utilized by systems and methods of the present disclosure.
Figure 25:
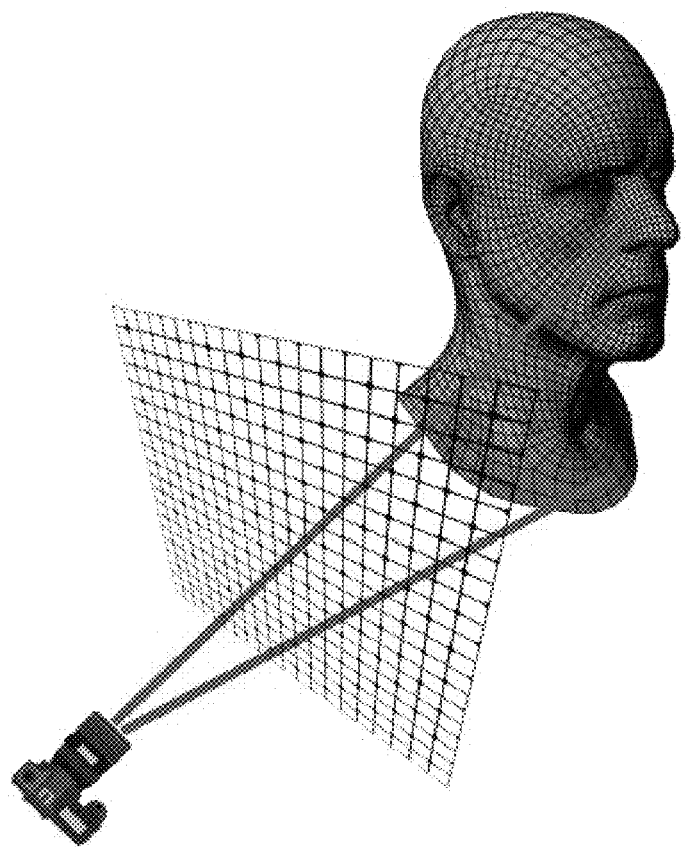
FIG. 25 schematically illustrates producing depth and position maps using the ray tracing technique, in accordance with one or more aspects of the present disclosure.
Figure 26:
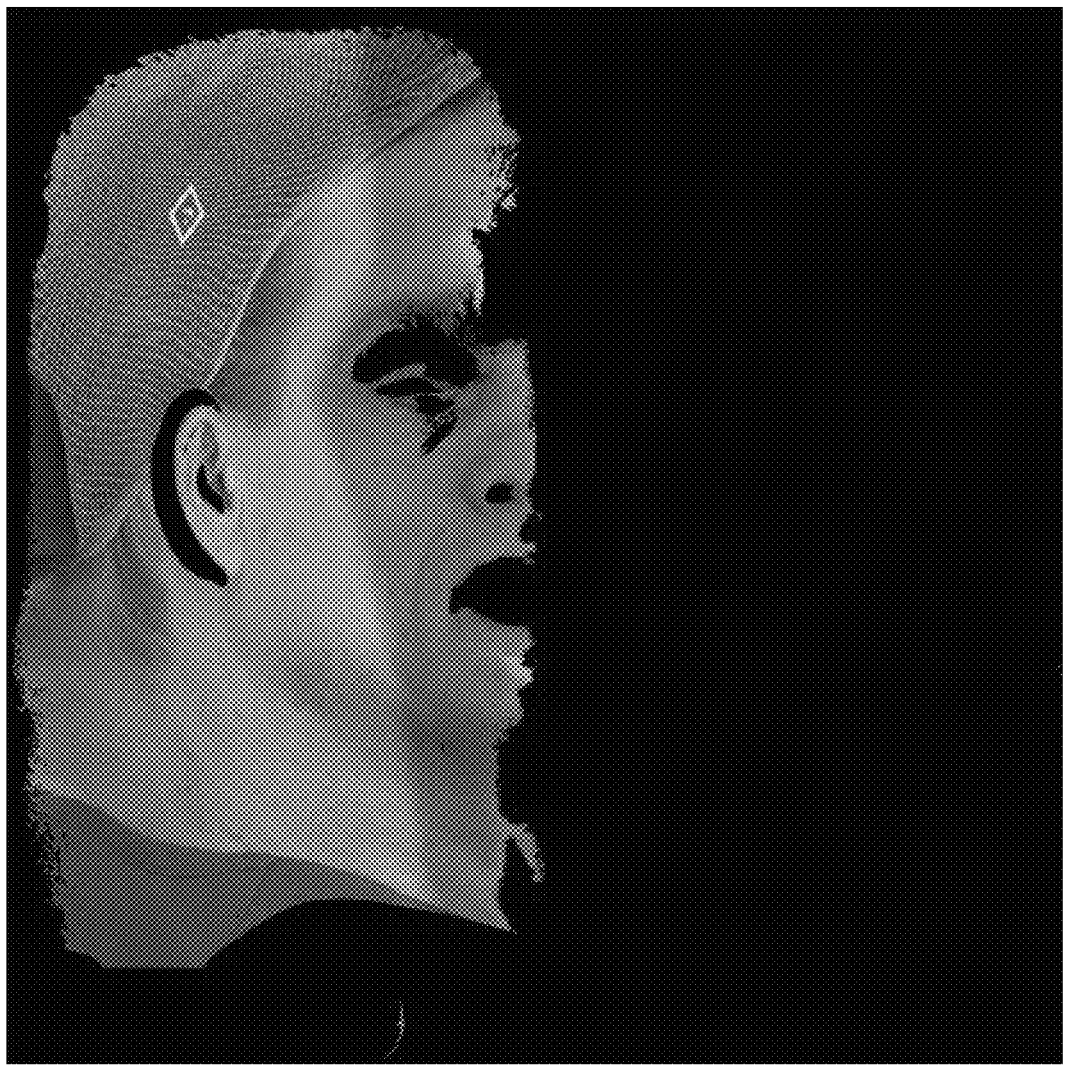
FIG. 26 schematically illustrates identifying, for each camera, UV map regions with high distortion (e.g., distortion level exceeding a pre-defined threshold), in accordance with one or more aspects of the present disclosure.
Figure 27:
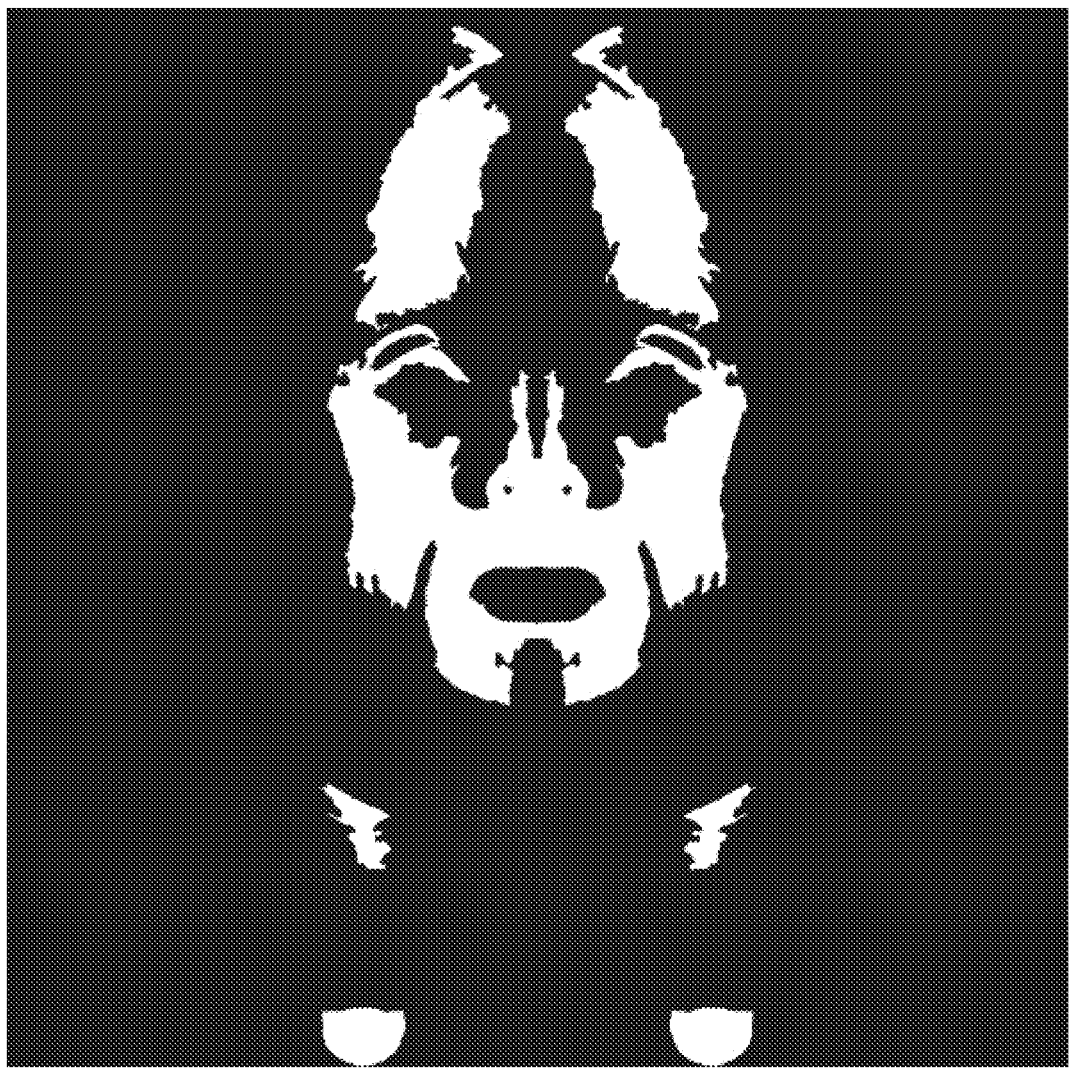
FIG. 27 shows an example mask defines a region of the UV map that is best covered by the field of view a corresponding camera, in accordance with one or more aspects of the present disclosure.
Figure 28:
FIG. 28 shows example UV masks before and after performing the fusion blend operation, in accordance with one or more aspects of the present disclosure.
Figure 29:
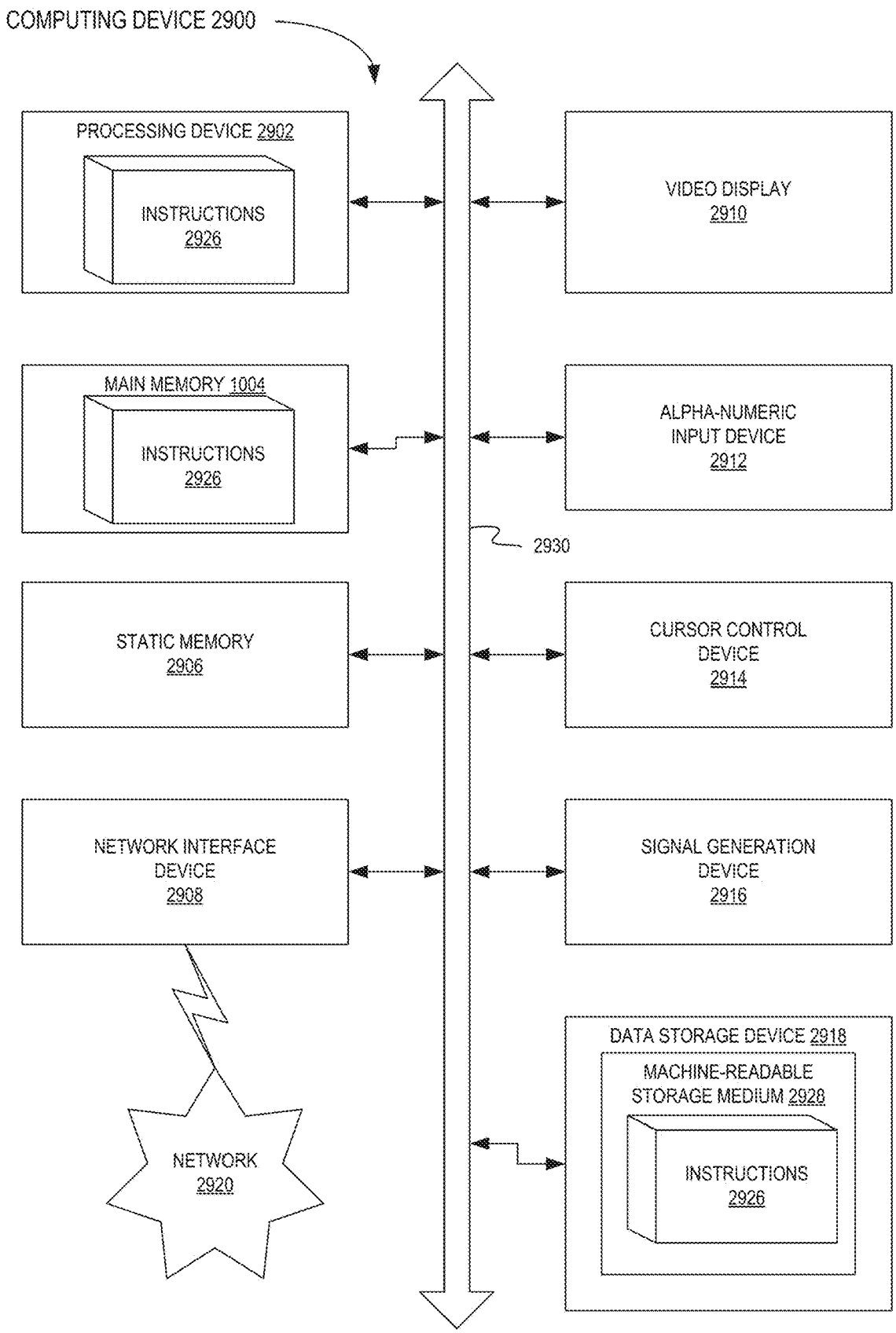
FIG. 29 depicts a block diagram of an illustrative computing device operating in accordance with one or more aspects of the present disclosure.

FIG. 22 shows the albedo map that has been acquired using the blending Lc (full-on illumination with cross filters) pattern. Each texture element ("texel") of the albedo map represents a color value of the object surface under diffused light with no shadows or light rays reflected by other surfaces. FIG. 23 shows an example blended images that have been acquired using $L_p$ (full-on illumination with parallel filters) pattern. FIG. 24 shows an example blended images that have been acquired using $L_x$ illumination and polarization pattern. FIG. 25 shows an example blended images that have been acquired using $L\hat{\ }_x$ illumination and polarization pattern. FIG. 26 shows an example blended images that have been acquired using $L_y$ illumination and polarization pattern. FIG. 27 shows an example blended images that have been acquired using $L'_y$ illumination and polarization pattern. FIG. 28 shows an example blended images that have been acquired using $L_z$ illumination and polarization pattern. FIG. 29 shows an example blended images that have been acquired using $L_z$ illumination and polarization pattern.

After blending, the images that have been acquired using $L_p$ (full-on illumination with parallel filters) and $L_c$ (full-on illumination with cross-polarized filters) patterns, are fed to the reflectance computation operation (block 255) which generates the reflectance map 260 illustrating distribution of specular reflectance on the surface of the three-dimensional object (e.g., model's head), as schematically illustrated by FIG. 20. Some regions of a human face may be more reflective than others (e.g., because of the type of skin cells and the characteristics of the underlying tissues). The specular reflection is visible in the images produces using parallel polarization filters, and is filtered by cross-polarized filters. Hence, the reflectance map may be produced by computing the difference between the images produced using $L_p$ (parallel polarization) and $L_c$ (cross-polarization) patterns. The reflectance coefficient for each pixel may be represented by the maximum color value (e.g., in the blue channel) of the pixel.

After blending, images that have been acquired using $L_x$, $L\hat{\ }_x$, $L_y$, $L\hat{\ }_y$, $L_z$, and $L\hat{\ }_z$ parallel-polarized filters and partial illumination patterns, are utilized for generating (block 165) the photometric normal map 270. FIG. 21 shows an example photometric normal map. The normal map comprises a plurality of elements, such that each element represents a surface normal at a corresponding image point. Normal map generation is based on the theory of spherical harmonic. The lighting patterns utilized for acquiring the images are designed in such a manner that the difference between images acquired using L and L^ patterns provides information about the surface normal direction. In other words, the difference between $L_x$ and $L\hat{\ }_x$ is used for calculating x component of the surface normal map ($n_x$), the difference between $L_y$ and $L\hat{\ }_y$ is used for calculating y component the surface normal map ($n_y$), and the difference between $L_z$ and $L\hat{\ }_z$ is used for calculating z component of the surface normal map ($n_z$). In certain implementations, the differences may only be computed for a specific color channel (e.g., the green channel):

$$G_x = L_x - L\hat{\ }_x$$

$$G_y = L_y - L\hat{\ }_y$$

$$G_z = L_z - L\hat{\ }_z$$

The computed differences may then be normalized by the value of $r = \|G_x^2 + G_y^2 + G_z^2\|$ for each pixel to produce the surface normal values:

$$n_x = G_x/r$$

$$n_y = G_y/r$$

$$n_z = G_z/r$$

While the green channel is used in the above computations, the same technique can be applied to the red and blue channels. However, the red channel is not preferred because low frequency light rays may enter the human skin and reflect after sub-surface scattering. Consequently, the corresponding surface normal map is not accurate enough for demonstrating micro-structures of human skin. Moreover, between the green and blue channels (which both capture high frequency light rays), the green channel is preferred because based on Bayer color array, the digital camera sensor has less blue cells than green cells, and hence, the blue channel is more susceptible to noise.

The final operation (275) of the image processing workflow is generating the displacement map 280. Based on the photometric normal map 270, the displacement map 280 is generated for the reconstructed polygonal mesh produced by the geometry reconstruction operation 225, such that after applying the displacement, the polygonal mesh would encompass all details of the surface normal map.

The polygonal meshes and texture maps produced by the image processing workflow 200 can be utilized in various applications, such as interactive video games. In an illustrative example, one or more files containing the polygonal meshes and textures may be distributed on the computer-readable media carrying executable interactive video game files. In another illustrative example, one or more files containing the polygonal meshes and textures may be downloaded by a client gaming device over a network from a gaming server.

Implementations aspects related to several of the above-referenced operations of the image processing workflow are described in more detail herein below.

As noted herein above, the acquired images are calibrated using a reference color chart. "Color calibration" refers to the process of determining and/or the color response of an image acquiring device (e.g., a camera). Color calibration may involve identifying a function linking the pixel intensities to a physical property (e.g., the scene irradiance). Color calibration results affect all other operations of the image processing workflow, and thus color calibration may be viewed as one of the most important operations of the workflow.

FIG. 22 schematically illustrates an example image capture sequence. The light rays incident onto the lens 221 pass through the lens thus forming the image plane irradiance 222, which may differ from the scene irradiance 223 due to various optical phenomena, such as Fernel effect and vignette. The camera sensor 224 measures the image plane irradiance and concerts it to pixel intensities based on its response function. The response function, which depends on the sensor technology and sensitivity, is usually represented by a non-linear function, therefore, the captured image 225 does not uniformly reflect the image plane irradiance 222. Furthermore, the pixel brightness may be affected by the exposure time.

FIG. 23 depicts a flowchart of an example method 2300 for color calibration, in accordance with one or more aspects of the present disclosure. The example method 2300 and/or each of its individual functions, routines, subroutines, or operations may be performed by one or more processors of a computer system (e.g., the computer system 2900 of FIG. 29), and may further employ one or more cameras, lighting assemblies, light synchronization controllers, and/or other equipment. The method 2300 may be performed by one or more processing threads, each thread executing one or more individual functions, routines, subroutines, or operations of the method.

The target color chart values (block 2310), which may be provided by the camera sensor manufacturer, may be converted to XYZ and RGB color spaces (blocks 2315-2320), e.g., using D50 white point and Bradford chromatic adaptation, thus producing the target values T and T* in XYZ and RGB color spaces, respectively. T* target values may be used for gain and white balance adjustment (block 2345), while T target values may be used for the main color calibration (block 2350) and tone re-mapping (block 2355).

The color calibration workflow may begin (block 2330) by acquiring one or more images of a color chart, such as Mac Beth color chart shown in FIG. 24, using the same illumination pattern and camera configuration as will be used for acquiring the input images (block 2335) to be processed by the image processing workflow 200.

After de-noising the acquired color chart image (block 2340), coordinates of the color chart within the image are determined (block 2345).

The average color value of each color chip is then determined (block 2350), after removing the outlier pixels. Pixels of the computed average values are stored in an image S, which has a pre-defined size, such as 4×6. The input image and the sampled chart are normalized by subtracting the RGB value of the black chip of the color chart from the color of each pixel and then dividing the result of the subtraction operation by the difference between the RGB values of the black chip and the white chip of the color chart:

$$I_n^{(i)} = \frac{I^{(i)} - b_s}{w_s - b_s}$$

$$S_n^{(i)} = \frac{S^{(i)} - b_s}{w_s - b_s}$$

where I denotes the input image to be calibrated,
S is the image comprising the computed average color values of the sample chart,
i is the pixel index,
$b_s$ is the RGB value of the black chip of the color chart, and
$w_s$ is the RGB value of the white chip of the color chart.

After the normalization, the RGB value of white would be 1 for all channels regardless of the capture and illumination configurations.

Upon completing the normalization, the optimal gain value may be computed (block 2355), which is a scalar multiplier that minimizes the sum of per-pixel differences between the normalized color chart and the target value in the RGB color space reduced by the RGB value of the black chip in the target chart:

$$\alpha = \min_{\hat{\alpha}} \sum_i (T^{(i)} - b_T - \hat{\alpha} S_n^{(i)})^2$$

where α denotes the optimal gain value,

T* is the target color chart value for RGB color space (produced at block 2340) and
$b_T$ is the RGB value of the black chip in the target chart.

Using the computed gain value, the adjusted input image and source sample values may be calculated as follows:

$$I_a^{(i)} = \alpha I_n^{(i)} + b_T$$

$$S_a^{(i)} = \alpha S_n^{(i)} + b_T$$

where $I_a$ and $S_a$ denote the adjusted input image and source samples, respectively.

Then, the best color transformation to XYZ color space may be calculated (block 2360) using the computed adjusted input image and source sample values. The color transformation may be represented by a 3×3 matrix which is multiplied by the RGB component of each pixel:

$$\begin{bmatrix} X \\ Y \\ Z \end{bmatrix} = M \begin{bmatrix} R \\ G \\ B \end{bmatrix}$$

where M denotes the color transformation matrix.

The optimal color transformation matrix is calculated by minimizing the difference between the target values in the RGB color space and adjusted source samples:

$$M = \min_{\hat{M}} \sum_i (T^{(i)} - \hat{M} S_a^{(i)})^2$$

where T denotes the target values in XYZ color spaces, and
$S_a$ denotes the adjusted source sample values.

The computed color transformation may be applied to the adjusted input image and source samples to produce the respective XYZ color space values, which may be fed to the tone remapping operation (block 2365):

$$I_x^{(i)} = M I_a^{(i)}$$

$$S_x^{(i)} = M S_a^{(i)}$$

Tone remapping operation (block 2365) determines three tone curves for X, Y, and Z channels, respectively. For a given color channel intensity C, the tone curve F(C) may be defined as follows:

$$F(C) = a_0 C^{\gamma_0} + a_1 C^{\gamma_1} + a_2 C^{\gamma_2}$$

Values of parameters α and γ may be determined by minimizing the error function represented by a sum of squared differences between the tone curve values and XYZ space target values, as follows:

$$\sum_i (F(^X S_x^{(i)}) - {}^X T^{(i)})^2 + \sum_i (F(^Y S_x^{(i)}) - {}^Y T^{(i)})^2 + \sum_i (F(^Z S_x^{(i)}) - {}^Z T^{(i)})^2$$

where $^X T$, $^Y T$, and $^Z T$ denote X, Y, Z channels of target values T in XYZ color space, and
$^X T_x$, $^Y T_x$, and $^Z T_x$ denote X, Y, Z channels of adjusted source samples $S_x$ in XYZ color space.

As the error function is non-linear, the optimal parameter values may be found by applying a non-linear optimization technique (such as simulated annealing or a similar method).

The tone remapping curve F is applied to the pixels of the adjusted input image $I_x$ and produces corresponding pixels of the tone-remapped image $I_o$. The tone remapping operation is optional and may be omitted if the user prefers to use the original tone (i.e., $I_x=I_O$).

The tone-remapped image $I_o$ is fed to the operation of conversion to RGB color space (block 2370), which converts $I_o$ to RGB color space based on Bradford chromatic adaptation and the desired white point (e.g., D65), thus producing the calibrated image (block 2375).

Another aspect of the present disclosure is related to the mask generation operation (block 240 of FIG. 2). As noted herein above, in order to produce a single UV map for each illumination pattern, partial UV maps produced by projecting the images acquired by different cameras may be blended by the mask generation (block 240 of FIG. 2) and fusion blend (block 245 of FIG. 2) operations. The mask generation operation produces, for each camera and illumination pattern, a mask that defines the region of the UV map that is best covered by the field of view of that camera. The mask generation operation involves two principal procedures: computing distortion maps for each camera and generating masks. The mask generation technique described herein considers different factors including the perspective stretch, geometry deformation, the image brightness, and the size of mask islands.

A distortion map has the form of the mesh UV layout; intensity of each pixel of the distortion map represents a level of distortion that the camera introduces for that certain pixel. In an illustrative example, for a mesh face which is directly facing the camera (i.e., if the mesh surface normal of the center point of the mesh matches the optical axis of the camera lens), the level of distortion would be close to zero; that level would increase as the angle between the mesh surface normal and the optical axis of the camera lens increases.

Producing the distortion map involves computing depth and position maps using the ray tracing technique, as schematically illustrated by FIG. 25. For each texture element ("texel"), the distance from the camera to the ray hit point is stored in the depth map and the position of the ray hit point is stored in the position map. A relative distortion of a texel may be defined as follows:

$$r_{i,j}=((D_{i-1,j}-D_{i+1,j})^2+(P_{i-1,j}-P_{i+1,j})^2)*h+((D_{i,j+1}-D_{i,j-1})^2+(P_{i,j+1}-P_{i,j-1})^2)*h$$

where $r_{i,j}$ denotes the relative distortion of the texel with image coordinates (i,j), $D_{i,j}$ is the depth of the texel with image coordinates (i,j),
$P_{i,j}$ is the position of the texel with image coordinates (i,j), and
h and w is the height and width of the rendered image, respectively.

Thus, the relative distortion will be zero if the depth and position remain unchanged for the texel's neighbors. Furthermore, the relative distortion depends on the resolution of the rendered image. Thus, the total distortion of a camera may be computed by summing relative distortions of several different image resolutions:

$$R=r^{(w)}+r^{(w/2)}+r^{(w/4)}+r^{(w/8)}+r^{(w/16)}$$

where R denotes the total distortion of a camera (for a given texel), and $r^{(w)}$ is the relative distortion of the image with the image width w, which for the example image processing workflow 200 of FIG. 2 is equal to the width of captured images (i.e., camera resolution).

After computing R (the total distortion of the camera), it is projected onto the mesh and mapped to the mesh UV in order to create the distortion map. The distortion map may be utilized for identifying, for each camera, UV map regions with high distortion (e.g., distortion level exceeding a pre-defined threshold), as schematically illustrated by FIG. 26. The identified high distortion regions may be filtered out (discarded).

Since the number of cameras producing the images for the example image processing workflow 200 of FIG. 2 is relatively high, more than one camera with an acceptable distortion level may be identified for any given UV map region. Thus, an additional factor may be needed for mask generation. Such a factor may be represented by the image brightness. Depending on the lighting pattern and camera position and orientation, an image region may appear brighter in one camera in comparison to other cameras, especially if the parallel polarization configuration (e.g., $L_x$) is used for acquiring the image. Hence, a camera producing the brightest image may be preferred among several cameras producing images with acceptable distortion levels.

Thus, a parallel polarization image and a corresponding distortion map may be used for computing a combined distortion and image map as follows:

$$E_l(i,j)=I_l(i,j) \text{ if } R_l(i,j)<D_T$$

$$E_l(i,j)=I_l(i,j)/(1+R_l(i,j)) \text{ if } R_l(i,j)>=D_T$$

Where l denotes the index of the camera,
$E_l$ is the combined distortion and image map for camera l,
$I_l$ is a parallel polarization image acquired by camera l,
$R_l$ is the distortion map of camera l, and
$D_T$ is the distortion threshold.

Using this definition allows only accepting distorted images if there is no other camera to cover the distorted regions.

The cameras may be sorted based on the combined distortion and image map E values for each pixel, such that the camera with highest E value would have the highest rank. Using strict ordering, only one camera would receive the highest rank for each texel in the UV map.

Then, a camera rank map $S_l$ may be produced such that the value of $S_l(i,j)$ reflects the rank of camera l (e.g., represented by the index of the camera in the sorted list of cameras based on the combined distortion and image map E values for each pixel). A group of connected pixels having the same $S_l$ value may form an island in the UV map. Each camera rank map $S_l$ may be searched for rank 1 islands having the size (i.e., the number of pixels) exceeding a pre-defined threshold value. The identified rank 1 islands may be exported to the mask of camera 1, which is denoted as $M_l$. The produced masks would not overlap (as strict ordering has been used for camera ranking). However, the masks would probably not cover the entire UV map.

In order to provide the complete UV map coverage, pixels may gradually be added to the islands. The neighboring pixels of initial islands of all cameras may be inserted into a queue that keeps pixels sorted based on their ranks. In other words, the queue stores tuples of (i, j, r, l), where i, j are the pixel coordinates, r is the rank, and l is the camera index. The tuples may iteratively be retrieved, one at a time, from the queue, until all UV map pixels are covered. For each retrieved tuple (i, j, r, l), if the pixel (i,j) defined by the tuple is not covered by any camera, the mask of camera 1 may be updated to include pixel (i,j) and the uncovered new neighboring pixel may be inserted into the priority queue.

Thus, the initial islands of rank 1 would gradually grow until no further improvement is possible. FIG. 27 shows an example generated mask.

As an optional feature, the mask generation procedure may be enhanced to support symmetric masks. With this option enabled, the input cameras may be paired based on the symmetry, and symmetric masks may be generated for each pair. In order to achieve this, after computing combined distortion and image maps E for all cameras, a new set of E maps may be calculated by averaging each pixel from El and the corresponding pixel of the flipped E image of its paired camera. The masks are then generated for this new E map set only for the left half of the UV map, which after computation is duplicated to the right half for the corresponding cameras.

As noted herein above, the masked images are then blended by the fusion blend operation (block 245 of FIG. 2). Blending background and foreground images attempts to stitch the images such that the resulting image would not exhibit any visible seams. FIG. 28 shows example UV masks before and after performing the fusion blend operation.

The blending procedure starts by blending all masked images into a single image and applying a Gaussian blur filter to the blending operation result, thus producing a blurred image which forms an initial background. Next, the first masked image, as the foreground, is blended with the initial background image, thus producing the next background image. The procedure is repeated for all the input images.

The blending procedure may change the pixel intensities, but should preserve the overall image structure and information conveyed by the image. As the information conveyed by the image may be described by Laplacian of the image, the blending operation may aim to preserve Laplacian of the image while adjusting pixel intensities.

Laplacian is a 2D isotropic measure of the second spatial derivative of an image:

$$L(x,y) = \partial^2 I/\partial x^2 + \partial^2 I/\partial y^2$$

where I(x,y) are the pixel intensity values.

Laplacian of an image highlights regions of rapid intensity change.

In certain implementations, the blending operation may be based upon Poisson image editing, in which the image is decomposed into its Laplacian and its boundary. A pair of non-overlapping, except for one strip of boundary pixels, foreground image F and background image B may be represented as follows:

$$B = B_u + B_b$$

$$F = F_u + F_b$$

where $B_b$ and $F_b$ are the boundary pixels, and $B_u$ and $F_u$ and background and foreground images without the boundary pixels, respectively.

The image blending operation may start by computing the Laplacian of the background image ($L_B$). Then, a new image N may be produced by solving Poisson equation for $L_B$ and $F_b$ and adding the result to $F_u$:

$$N = P(L_B, F_b) + F_u$$

where $P(L_B, F_b)$ denotes the solution of Poisson equation for $L_B$ and $F_b$.

Thus, the new image N contains the foreground F, but changes the background area such that it respects the boundary of F. The result may still not be seamless as the foreground in not yet adapted.

Next, another image may be produced by solving Poison equation for N and $B_b$ and adding the result to $B_u$:

$$M = P(N, B_b) + B_u$$

The resulting image M is a solid and seamless image. Laplacians of both background and foreground are preserved except for boundary pixels and their immediate neighbors.

Another aspect of the present disclosure is related to the displacement map generation operation (block 275 of FIG. 2). As noted herein above, the displacement map 280 is generated based on the photometric normal map 270 for the reconstructed polygonal mesh produced by the geometry reconstruction operation 225, such that after applying the displacement, the polygonal mesh would encompass all details of the surface normal map.

A displacement map is a two-dimensional image in which pixel intensities define corresponding displacement values. Similarly to surface normal and albedo maps, the displacement map is defined on the UV layout of the polygonal mesh. To displace a vertex, it is moved in direction of its normal with the magnitude specified by the displacement value. Regardless of the mesh resolution, a point of the polygonal mesh corresponding to any texel can be determined using inverse projection. The displacement can be defined as follows:

$$w_{(i,j)} = v_{(i,j)} + d_{(i,j)} f_{(i,j)}$$

where $w_{(i,j)}$ denotes the updated vertex, $v_{(i,j)}$ is a point of the input mesh corresponding to the UV pixel having the coordinates of (i,j), $d_{(i,j)}$ is the amount of displacement, and $f_{(i,j)}$ is the surface normal vector.

It may be desired to calculate the displacement value for each vertex such that after performing the displacement, each surface normal would be equal to the photometric normal value. Such constraint is satisfied if the photometric normal n is orthogonal to the tangent of the updated mesh. Using the central difference formula, this constraint may be expressed as follows:

$$n_{(i,j)} \perp w_{(i,j+1)} - w_{(i,j-1)}$$

$$n_{(i,j)} \perp w_{(i+1,j)} - w_{(i-1,j)}$$

where $\perp$ denotes the orthogonality relationship.

Using the above definition of displacement, the orthogonality constraints may be expressed as follows:

$$n_{(i,j)} \perp v_{(i,j+1)} - v_{(i,j-1)} + d_{(i,j+1)} f_{(i,j+1)} - d_{(i,j-1)} f_{(i,j-1)}$$

$$n_{(i,j)} \perp v_{(i+1,j)} - v_{(i-1,j)} + d_{(i+1,j)} f_{(i+1,j)} - d_{(i-1,j)} f_{(i-1,j)}$$

Applying the inner product operation to these orthogonality constraints produces the following system of linear equations:

$$-n_{(i,j)} v_{(i,j+1)} - v_{(i,j-1)} = d_{(i,j+1)} n_{(i,j)} f_{(i,j+1)} - d_{(i,j-1)} n_{(i,j)} f_{(i,j-1)}$$

$$-n_{(i,j)} v_{(i+1,j)} - v_{(i-1,j)} = d_{(i+1,j)} n_{(i,j)} f_{(i+1,j)} - d_{(i-1,j)} n_{(i,j)} f_{(i-1,j)}$$

Solving the system of linear equations would produce the optimal displacement values d.

In order to apply the displacement map, the computed vertices are inserted to the input mesh. In other words, for each texel of the UV layout map, a vertex is inserted into a corresponding position of the mesh.

FIG. 29 illustrates a diagrammatic representation of a computing device 2900 which may implement the systems and methods described herein. Computing device 2900 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 2900 may include a processing device (e.g., a general purpose processor) 2902, a main memory 2904 (e.g., synchronous dynamic random access memory (DRAM), read-only memory (ROM)), a static memory 2906 (e.g., flash memory and a data storage device 2918), which may communicate with each other via a bus 2930.

Processing device 2902 may be provided by one or more general-purpose processing devices such as a microprocessor, central processing unit, or the like. In an illustrative example, processing device 2902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 2902 may also comprise one or more special-purpose processing devices such as an application specific integrated circuit (ASIC), a field programmable gate array (FPGA), a digital signal processor (DSP), network processor, or the like. The processing device 2902 may be configured to execute module 1526 implementing workflows 200 and/or 2200 for generating visual objects representing a person based on two-dimensional images of at least a part of the person's body, in accordance with one or more aspects of the present disclosure, for performing the operations and steps discussed herein.

Computing device 2900 may further include a network interface device 2908 which may communicate with a network 2920. The computing device 2900 also may include a video display unit 2929 (e.g., a liquid crystal display (LCD) or a cathode ray tube (CRT)), an alphanumeric input device 2912 (e.g., a keyboard), a cursor control device 2914 (e.g., a mouse) and an acoustic signal generation device 2916 (e.g., a speaker). In one embodiment, video display unit 2929, alphanumeric input device 2912, and cursor control device 2914 may be combined into a single component or device (e.g., an LCD touch screen).

Data storage device 2918 may include a computer-readable storage medium 2928 on which may be stored one or more sets of instructions, e.g., instructions of module 2926 implementing workflows 200 and/or 2200 for generating three-dimensional visual objects representing a person based on two-dimensional images of at least a part of the person's body. Instructions implementing module 2926 may also reside, completely or at least partially, within main memory 2904 and/or within processing device 2902 during execution thereof by computing device 2900, main memory 2904 and processing device 2902 also constituting computer-readable media. The instructions may further be transmitted or received over a network 2920 via network interface device 2908.

While computer-readable storage medium 2928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving a plurality of images of a three-dimensional object, wherein the plurality of images has been acquired by a plurality of cameras using a plurality of illumination and polarization patterns;
performing color calibration of the plurality of images to produce a plurality of color-calibrated images;
generating, using the plurality of color-calibrated images, a polygonal mesh simulating geometry of the three-dimensional object;
producing a plurality of partial UV maps by projecting the plurality of color-calibrated images onto the polygonal mesh;
generating a plurality of combined distortion and image maps, wherein each combined distortion and image map associated with a respective camera of the plurality of cameras comprises a plurality of pixels, such that intensity of each pixel of the plurality of pixels represents a level of distortion introduced by the respective camera for the pixel;

producing, based on the combined distortion and image maps, a plurality of camera rank maps, wherein each camera rank map associated with a respective camera of the plurality of cameras comprises for every pixel, an index of the respective camera in a list of cameras that is sorted by the level of distortion;

generating, based on the camera rank maps, a plurality of masks, wherein each mask of the plurality of masks is associated with a respective camera of the plurality of cameras, wherein the mask defines a UV space region that is covered by a field of view of the camera;

blending, using the plurality of masks, the plurality of partial UV maps; and generating one or more texture maps representing the three-dimensional object.

2. The method of claim 1, further comprising:
utilizing the texture maps for creating an interactive video game.

3. The method of claim 1, further comprising:
undistorting the plurality of color-calibrated images to remove at least one of: radial distortion or tangential distortion.

4. The method of claim 1, wherein the texture maps comprise a reflectance map illustrating distribution of specular reflectance on a surface of the three-dimensional object.

5. The method of claim 1, wherein the texture maps comprise an albedo map produced from a plurality of images acquired under full-on illumination with cross-polarized filters.

6. The method of claim 1, wherein the texture maps comprise a normal map produced from a plurality of images acquired under partial illumination with parallel-polarized filters.

7. The method of claim 1, wherein the texture maps comprise a displacement map comprising a plurality of elements, each element defining a displacement values for a corresponding texture element.

8. The method of claim 1, wherein generating the polygonal mesh further comprises:
determining, using a plurality of images acquired under full-on illumination with parallel-polarized filters, positions of a plurality of markers of a pre-defined color within each image.

9. The method of claim 1, wherein performing color calibration of the plurality of images further comprises:
performing a non-linear tone remapping operation.

10. The method of claim 1, wherein blending the plurality of partial UV maps further comprises:

producing a background image by blending a plurality of masked images;

blending a next masked image of the plurality of masked images with the background image to produce a new background image;

iteratively repeating the blending operation for all masked image of the plurality of masked images.

11. A computer-readable non-transitory storage medium comprising executable instructions that, when executed by a processor, cause the processor to:

receive a plurality of images of a three-dimensional object, wherein the plurality of images has been acquired by a plurality of cameras using a plurality of illumination and polarization patterns;

perform color calibration of the plurality of images to produce a plurality of color-calibrated images;

generate, using the plurality of color-calibrated images, a polygonal mesh simulating geometry of the three-dimensional object;

produce a plurality of partial UV maps by projecting the plurality of color-calibrated images onto the polygonal mesh;

generate a plurality of combined distortion and image maps, wherein each combined distortion and image map associated with a respective camera of the plurality of cameras comprises a plurality of pixels, such that intensity of each pixel of the plurality of pixels represents a level of distortion introduced by the respective camera for the pixel;

produce, based on the combined distortion and image maps, a plurality of camera rank maps, wherein each camera rank map associated with a respective camera of the plurality of cameras comprises for every pixel, an index of the respective camera in a list of cameras that is sorted by the level of distortion;

generate, based on the camera rank maps, a plurality of masks, wherein each mask of the plurality of masks is associated with a respective camera of the plurality of cameras, wherein the mask defines a UV space region that is covered by a field of view of the camera;

blend, using the plurality of masks, the plurality of partial UV maps; and generate one or more texture maps representing the three-dimensional object.

12. The computer-readable non-transitory storage medium of claim 11, further comprising executable instructions causing the processor to:
utilize the texture maps for creating an interactive video game.

* * * * *